(12) United States Patent
Tripathy et al.

(10) Patent No.: US 12,535,409 B2
(45) Date of Patent: Jan. 27, 2026

(54) APPARATUSES, METHODS, AND COMPUTER PROGRAM PRODUCTS FOR GAS DETECTION

(71) Applicant: Honeywell Analytics Inc., Charlotte, NC (US)

(72) Inventors: Janmejaya Tripathy, Charlotte, NC (US); Sumit Suresh Kulkarni, Charlotte, NC (US); Nimmagadla Lakshmi Snehita, Charlotte, NC (US)

(73) Assignee: Honeywell Analytics Inc., Charlotte, NC (US)

( * ) Notice: Subject to any disclaimer, the term of this patent is extended or adjusted under 35 U.S.C. 154(b) by 212 days.

(21) Appl. No.: 18/405,716

(22) Filed: Jan. 5, 2024

(65) Prior Publication Data

US 2024/0241045 A1    Jul. 18, 2024

(30) Foreign Application Priority Data

Jan. 12, 2023    (IN) .............................. 202311002476

(51) Int. Cl.
*G01N 21/3504* (2014.01)
*G01N 21/27* (2006.01)
(Continued)

(52) U.S. Cl.
CPC ....... *G01N 21/3504* (2013.01); *G01N 21/274* (2013.01); *G06N 3/08* (2013.01); *G01N 2201/1296* (2013.01); *G16C 20/70* (2019.02)

(58) Field of Classification Search
CPC ..... G06N 3/08; G01N 21/3504; G01N 21/274
See application file for complete search history.

(56) References Cited

U.S. PATENT DOCUMENTS

| 10,684,216 B2 | 6/2020 | Wang |
| 2022/0091026 A1* | 3/2022 | Scott ..................... G01P 13/045 |

FOREIGN PATENT DOCUMENTS

| CN | 110146455 A | 8/2019 |
| CN | 112464999 B | 10/2021 |
| CN | 115099337 A | 9/2022 |

OTHER PUBLICATIONS

Extended European Search Report Mailed on May 24, 2024 for EP Application No. 23217890, 9 page(s).

(Continued)

*Primary Examiner* — Casey Bryant
(74) *Attorney, Agent, or Firm* — Alston & Bird LLP

(57) ABSTRACT

Methods, apparatuses, and computer program products for energy-centric predictive maintenance scheduling are provided. For example, a computer-implemented method may include separately scanning each of a predetermined plurality of different training gases with infrared light at each of a first predetermined plurality of different wavelengths, for each of the predetermined plurality of different training gases, detecting and recording the absorption of the infrared light at each of the different wavelengths, creating a plurality of training absorption waveforms, one training absorption waveform for each possible different combination of each of the predetermined plurality of different training gases at each of a predetermined plurality of different concentrations and at each of a predetermined plurality of different temperatures, determining a plurality of training waveform features of each training absorption waveform, and inputting the plurality of training waveform features for each training absorption waveform into a data model to train the data model.

20 Claims, 12 Drawing Sheets

(51) Int. Cl.
　　　*G06N 3/08* 　　　(2023.01)
　　　*G16C 20/70* 　　　(2019.01)

(56) References Cited

OTHER PUBLICATIONS

Igor L. Fufurin et al., "Numerical techniques for infrared spectra analysis of organic and inorganic volatile compounds for biomedical applications," Optical Engineering, 60(8):082016-1-082016-16, (Aug. 2021).

ZH Murong et al., "Research and application of SVM analysis model for spectral fingerprint of mixed gas," Journal of Physics: Conference Series, 1721(1):1-8, (Jan. 7, 2021).

* cited by examiner

APPARATUSES, METHODS, AND COMPUTER PROGRAM PRODUCTS FOR GAS DETECTION

CROSS-REFERENCE TO RELATED DOCUMENTATION

This application claims priority pursuant to 35 U.S.C. 119(a) to Indian Application No. 202311002476, filed Jan. 12, 2023, which application is incorporated herein by reference in its entirety.

TECHNOLOGICAL FIELD

Example embodiments of the present disclosure relate generally to detecting potentially hazardous gases and, more particularly, to methods, apparatuses, and computer program products for providing machine learning and artificial-intelligence-based identification and quantification of potentially hazardous gases.

BACKGROUND

Many industrial facilities/applications have the potential to produce and/or release one or more gases which may cause a hazardous, sometimes potentially explosive, atmosphere within the facility. Such industrial facilities/applications include, but are not limited to, offshore oil and gas platforms, floating production storage and offloading vessels, tankers, onshore oil and gas terminals, refineries, liquified natural gas bottling plants, gas compressor/metering stations, and gas turbine power plants. Such potentially hazardous gases include, but are not limited to, hydrocarbons such as methane, ethane, propane, and butane. The atmosphere within and around such industrial facilities is typically monitored to detect the presence of such potentially hazardous gases to prevent an accumulation that could result in an explosion.

Conventional optical infrared gas detectors are often installed in and around such industrial facilities. Such conventional gas detectors are typically calibrated to detect a single type of gas and are therefore termed "fixed gas detectors." Such conventional gas detectors provide relatively quick analysis of the atmosphere and detection of the calibrated gas. However, some industrial facilities/applications are capable of producing/releasing multiple different types of hazardous gases. These fixed gas detector are prone to cross sensitivity issues when exposed to other gases in the environment due to cross interference in the spectral absorption properties. Some gases have a stronger absorption peak than the calibrated gas. This can result in a "false alarm" condition, where an alarm is triggered when the cumulative concentration of flammable gas mixture has not reached the predetermined safety limit.

More sophisticated gas analyzers, such as those that use Fourier Transform Infrared (FTIR) spectroscopy, are capable of detecting many different gases and combinations of gases due to their ability to scan a large wavelength range with a resolution of about 0.1 nanometer (nm). However, such FTIR gas analyzers are significantly more expensive than conventional single gas detectors and take much longer to complete a scan and detect the gas(es) present, thereby limiting their usability. Moreover, conventional Michelson-type FTIR gas analyzers can be negatively affected by vibration and temperature shift.

Applicant has discovered problems with current implementations of gas detection systems and methods. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure provided herein provide improvements in gas detection. Other implementations for gas detection will be, or will become, apparent to one with skill in the art upon examination of the following figures and detailed description. It is intended that all such additional implementations be included within this description be within the scope of the disclosure and be protected by the following claims.

In accordance with a first aspect of the disclosure, a method is provided. The method may be computer-executed via one or more computing devices embodied in hardware, software, firmware, and/or a combination thereof, as described herein. An example implementation of the method is performed at a device with one or more processors and one or more memories. The example method includes separately scanning each of a predetermined plurality of different training gases with infrared light at each of a first predetermined plurality of different wavelengths, for each of the predetermined plurality of different training gases, detecting and recording the absorption of the infrared light at each of the first predetermined plurality of different wavelengths, creating a plurality of training absorption waveforms, one training absorption waveform for each possible different combination of each of the predetermined plurality of different training gases at each of a predetermined plurality of different concentrations and at each of a predetermined plurality of different temperatures, determining a plurality of training waveform features of each training absorption waveform, inputting the plurality of training waveform features for each training absorption waveform into a data model to train the data model, scanning an unknown gas or an unknown combination of gases with infrared light at each of a second predetermined plurality of different infrared wavelengths, detecting and recording the absorption of the infrared light at each of the second predetermined plurality of different wavelengths, creating a detection absorption waveform for the scanned unknown gas or unknown combination of gases, determining a plurality of detection waveform features of the detection absorption waveform, inputting the plurality of detection waveform features of the detection absorption waveform into the data model, generating from the data model an identity and concentration of the unknown gas or of each gas of the unknown combination of gases, and displaying the identity and concentration of the unknown gas or of each gas of the unknown combination of gases on at least one display. In the example method, the unknown gas or unknown combination of gases comprises one or more of the predetermined plurality of different training gases.

Additionally or alternatively, in some example embodiments of the method, the second predetermined plurality of different wavelengths equals the first predetermined plurality of different wavelengths or the second predetermined plurality of different wavelengths is a subset of the first predetermined plurality of different wavelengths Additionally or alternatively, in some example embodiments of the method, the first and second predetermined plurality of different wavelengths are evenly spaced over a predetermined wavelength range.

Additionally or alternatively, in some example embodiments of the method, separately scanning each of the predetermined plurality of different training gases comprises separately scanning each of the predetermined plurality of different training gases at each of the predetermined plurality of different concentrations.

Additionally or alternatively, in some example embodiments of the method, separately scanning each of the predetermined plurality of different training gases comprises separately scanning each of the predetermined plurality of different training gases at each of the predetermined plurality of different temperatures.

Additionally or alternatively, in some example embodiments of the method, the method further comprises determining a temperature of the scanned unknown gas or unknown combination of gases and inputting the determined temperature of the scanned unknown gas or unknown combination of gases into the data model.

Additionally or alternatively, in some example embodiments of the method, the method further comprises determining a lower explosion limit percentage of the scanned unknown gas or unknown combination of gases.

In accordance with another aspect of the disclosure, an example system is provided. In at least one example embodiment, an example system includes at least one processor and at least one memory. The at least one memory has computer program code stored thereon that, in execution with the at least one processor, configures the system to perform any one of the example methods described herein. In yet another example embodiment, an example system includes means for performing each step of any one of the example methods described herein.

In accordance with yet another aspect of the disclosure, an example computer program product is provided. The example computer program product includes at least one non-transitory computer-readable storage medium having computer program code stored thereon that, in execution with at least one processor, configures the at least one processor to perform any one of the example methods described herein.

BRIEF DESCRIPTION OF THE DRAWINGS

Figure 1:
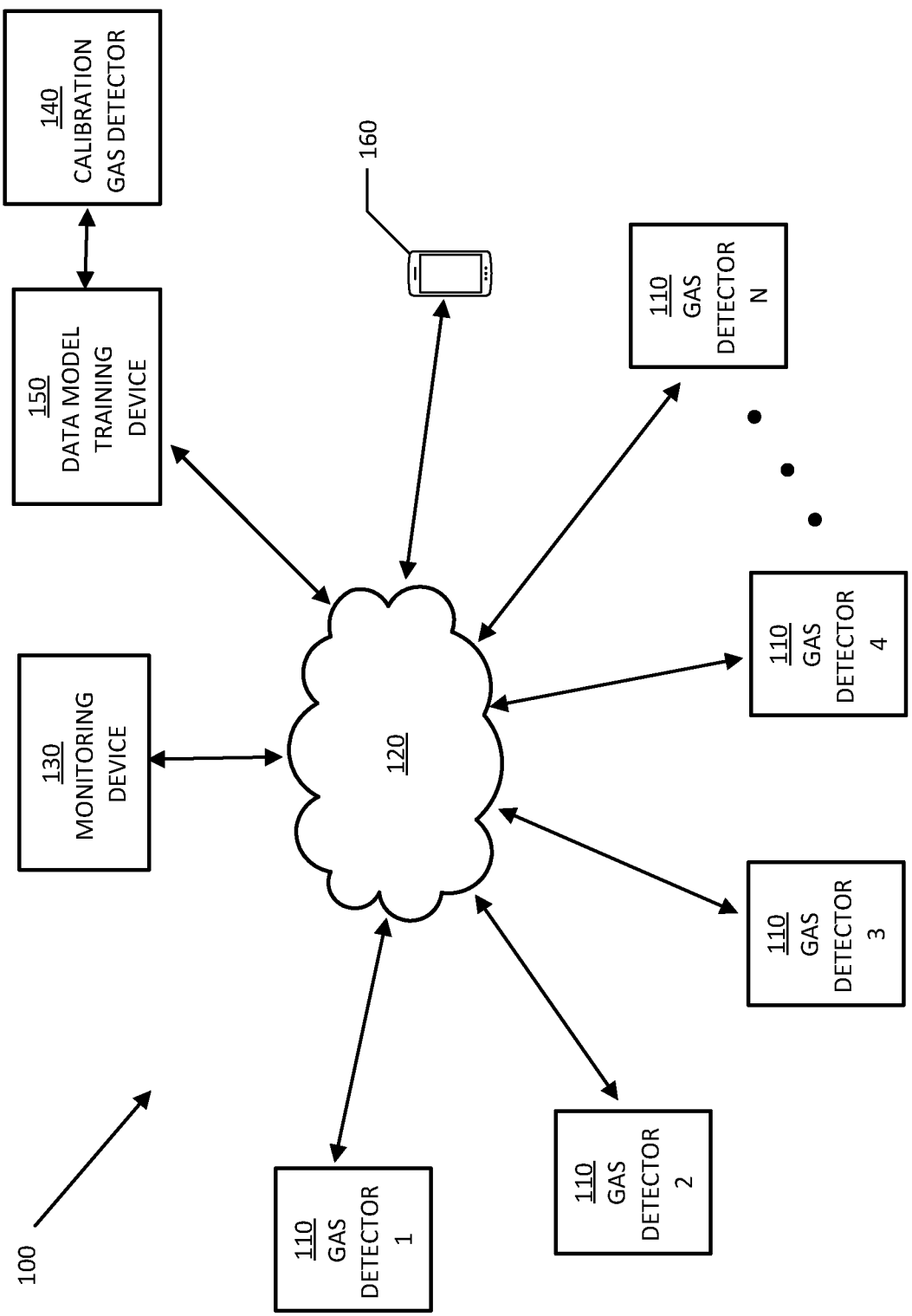
Figure 2:
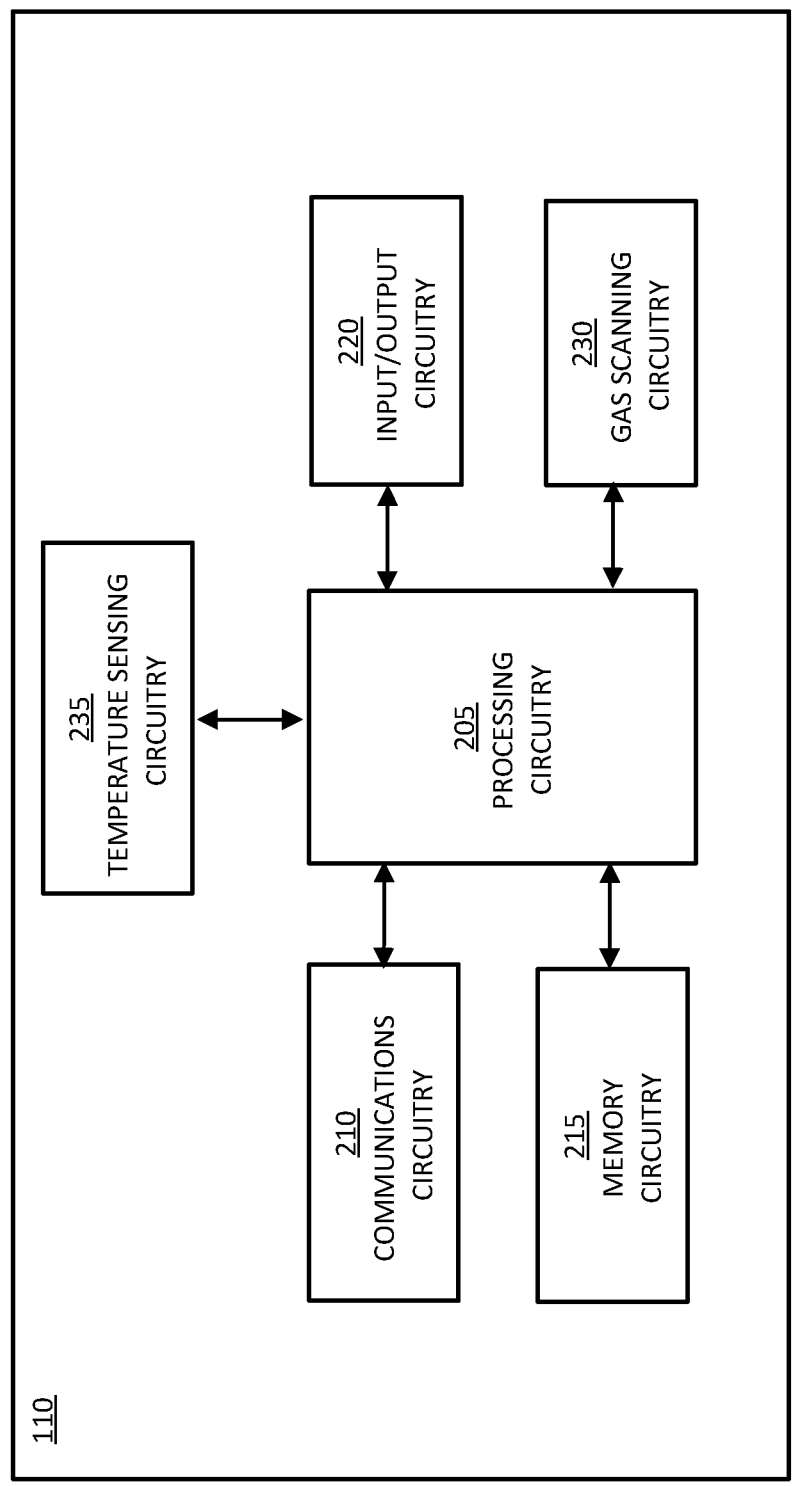
Figure 3:
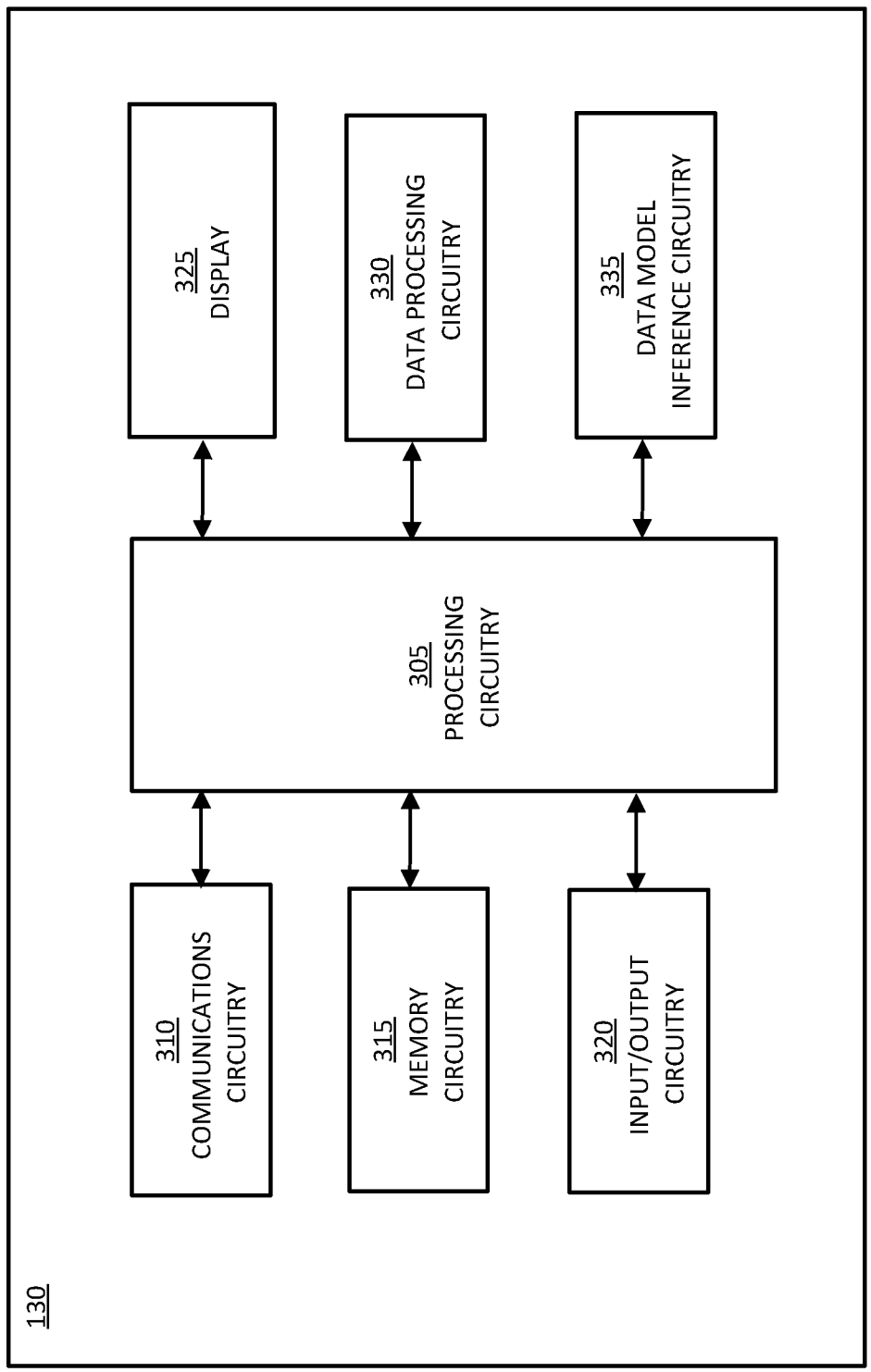
Figure 4:
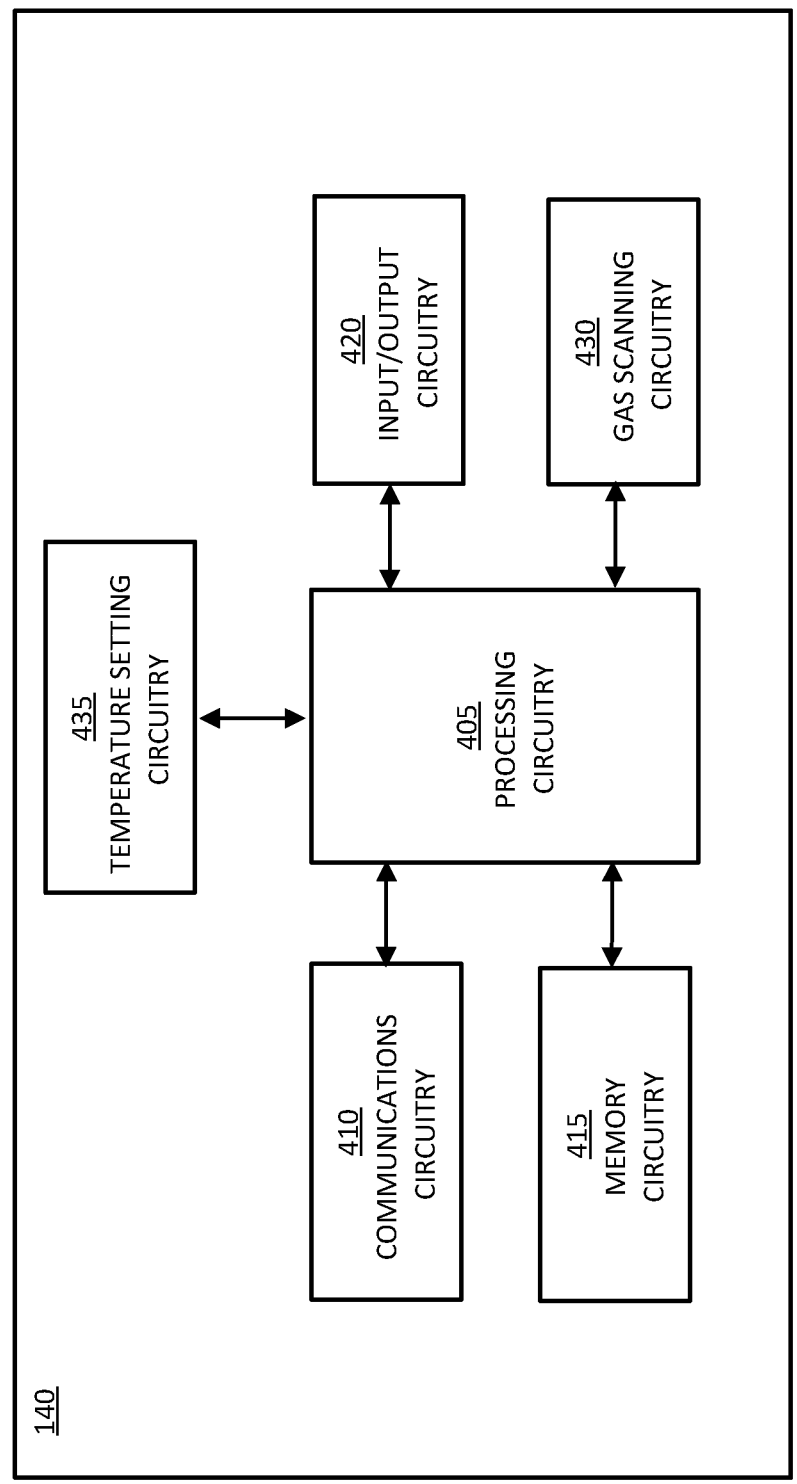
Figure 5:
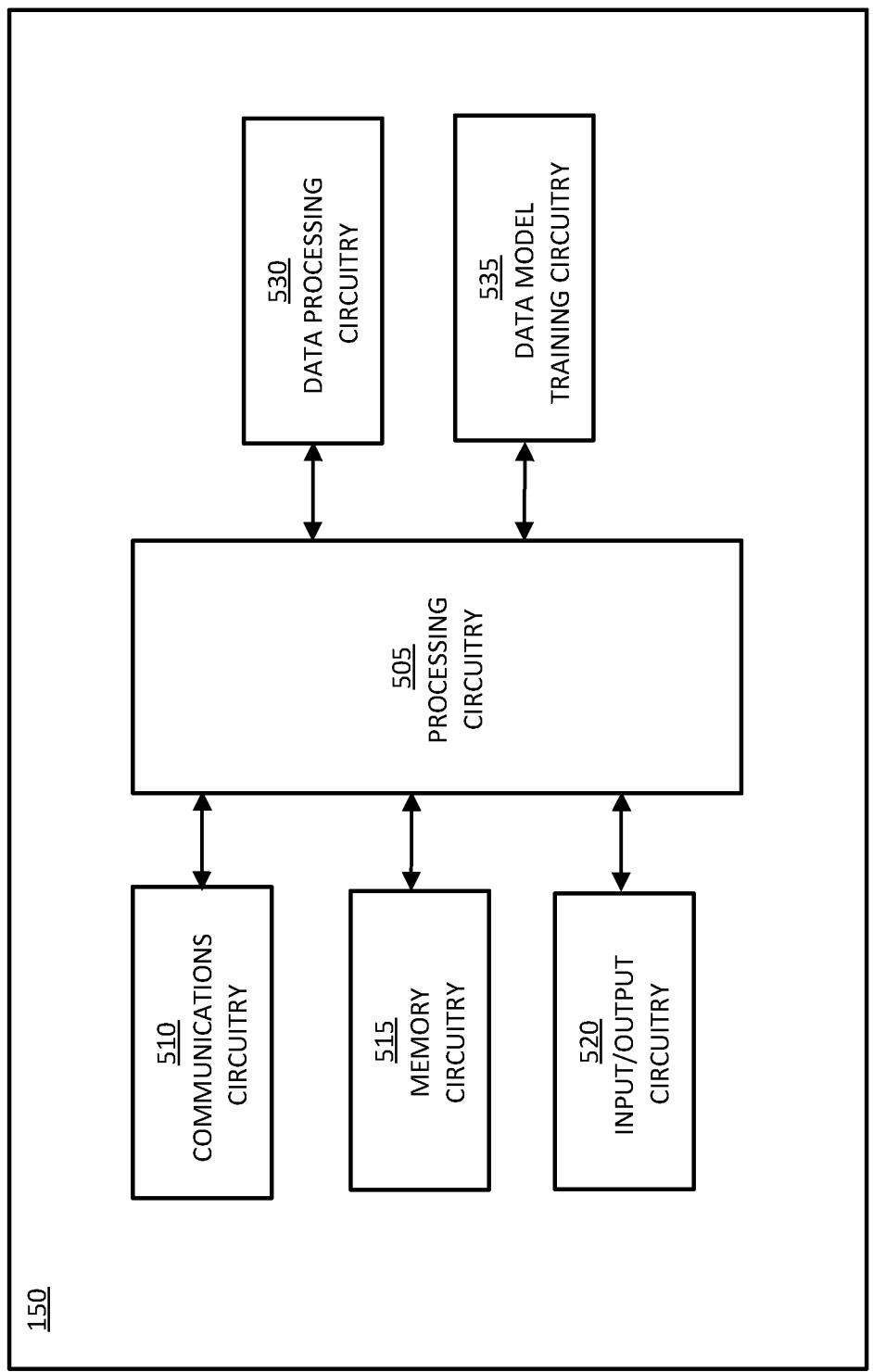
Figure 6:
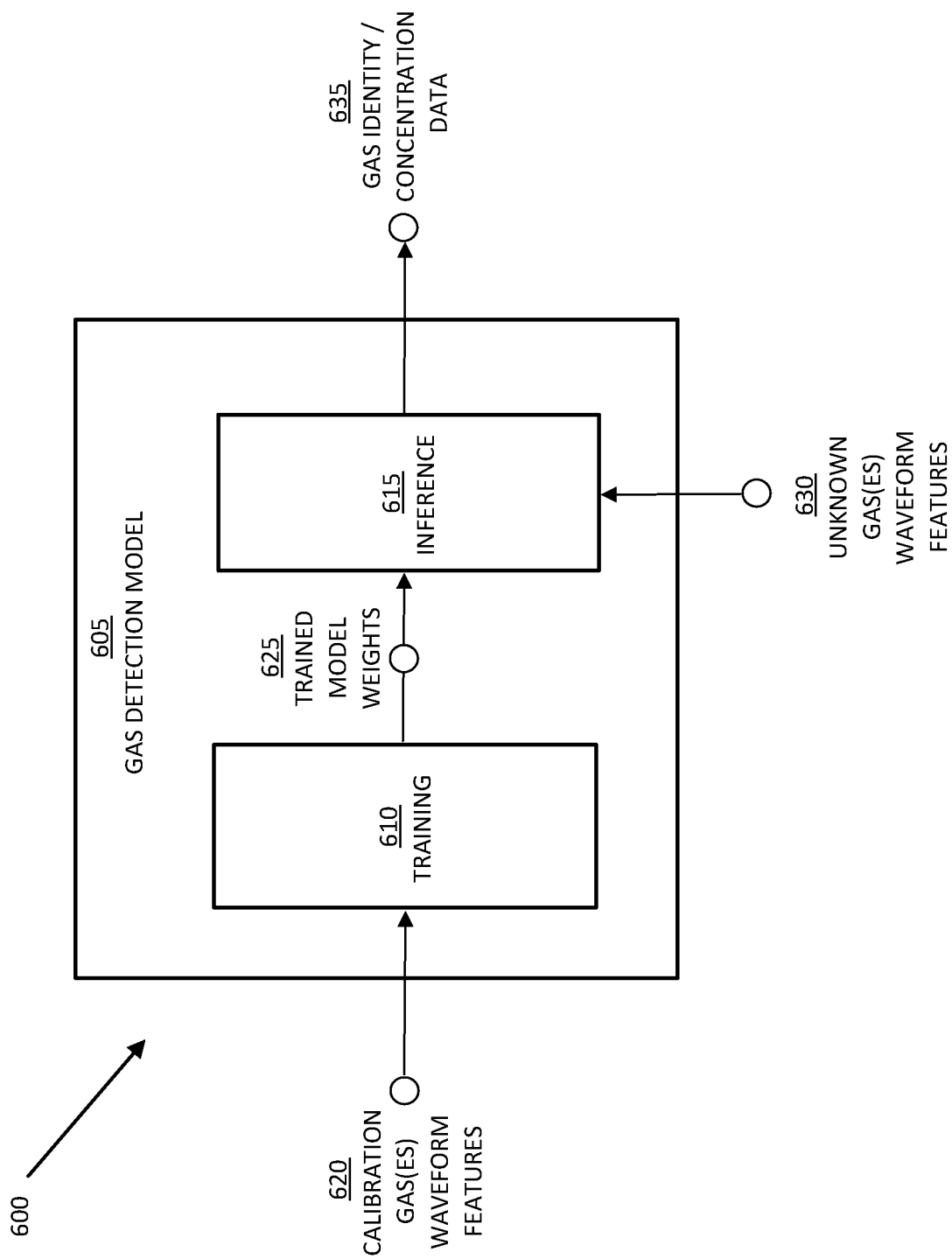
Figure 7:
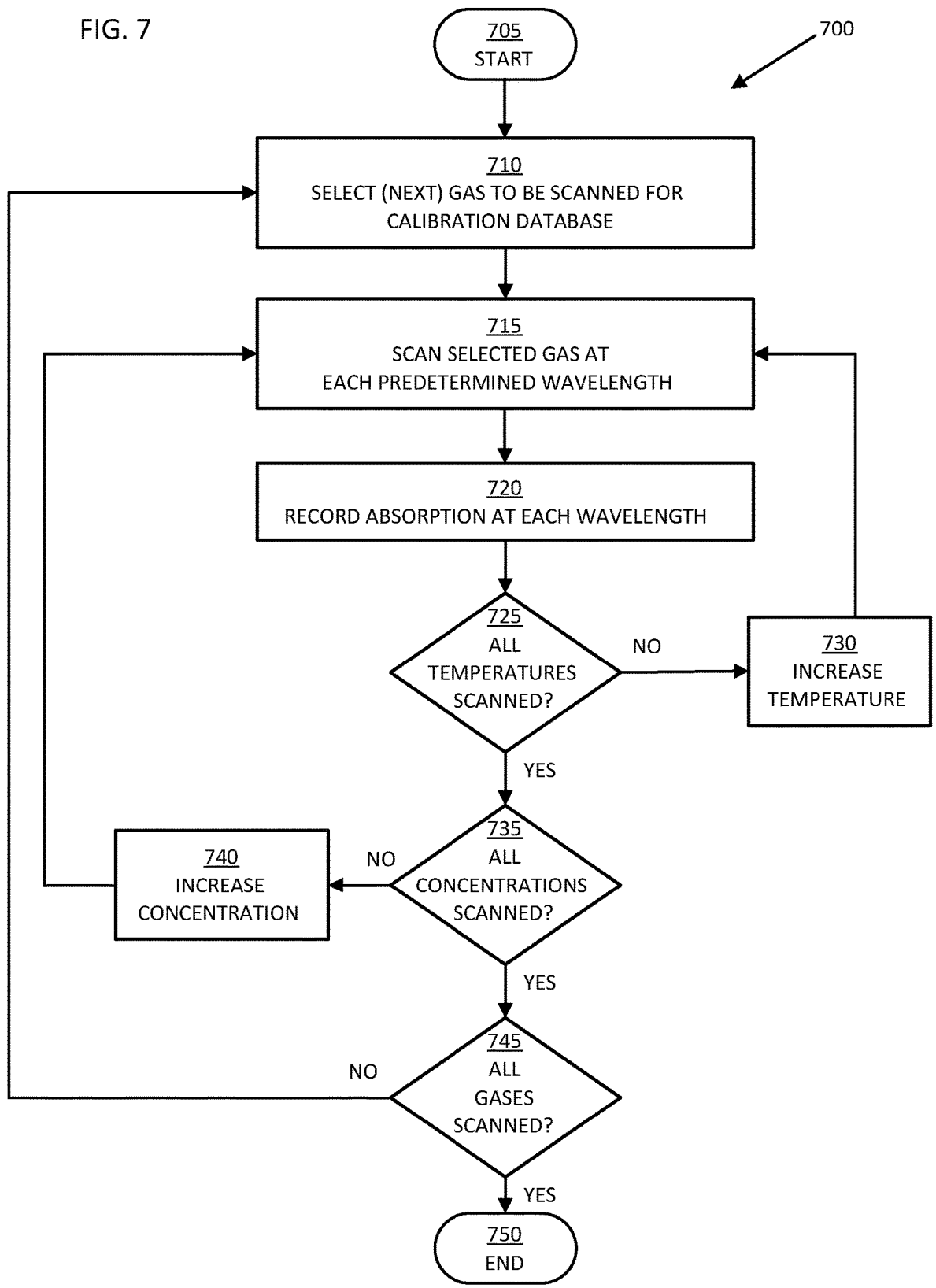
Figure 8:
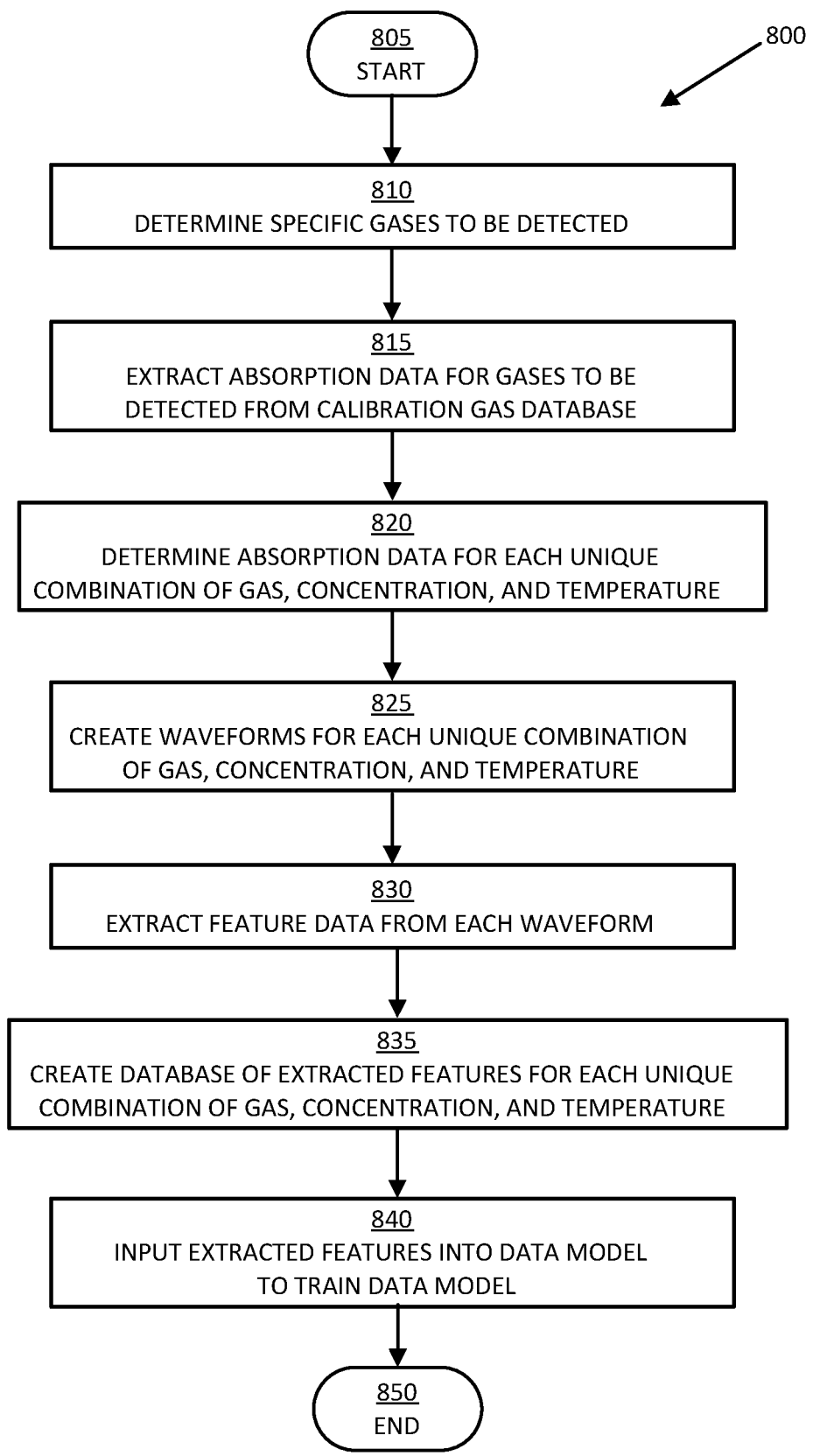
Figure 9:
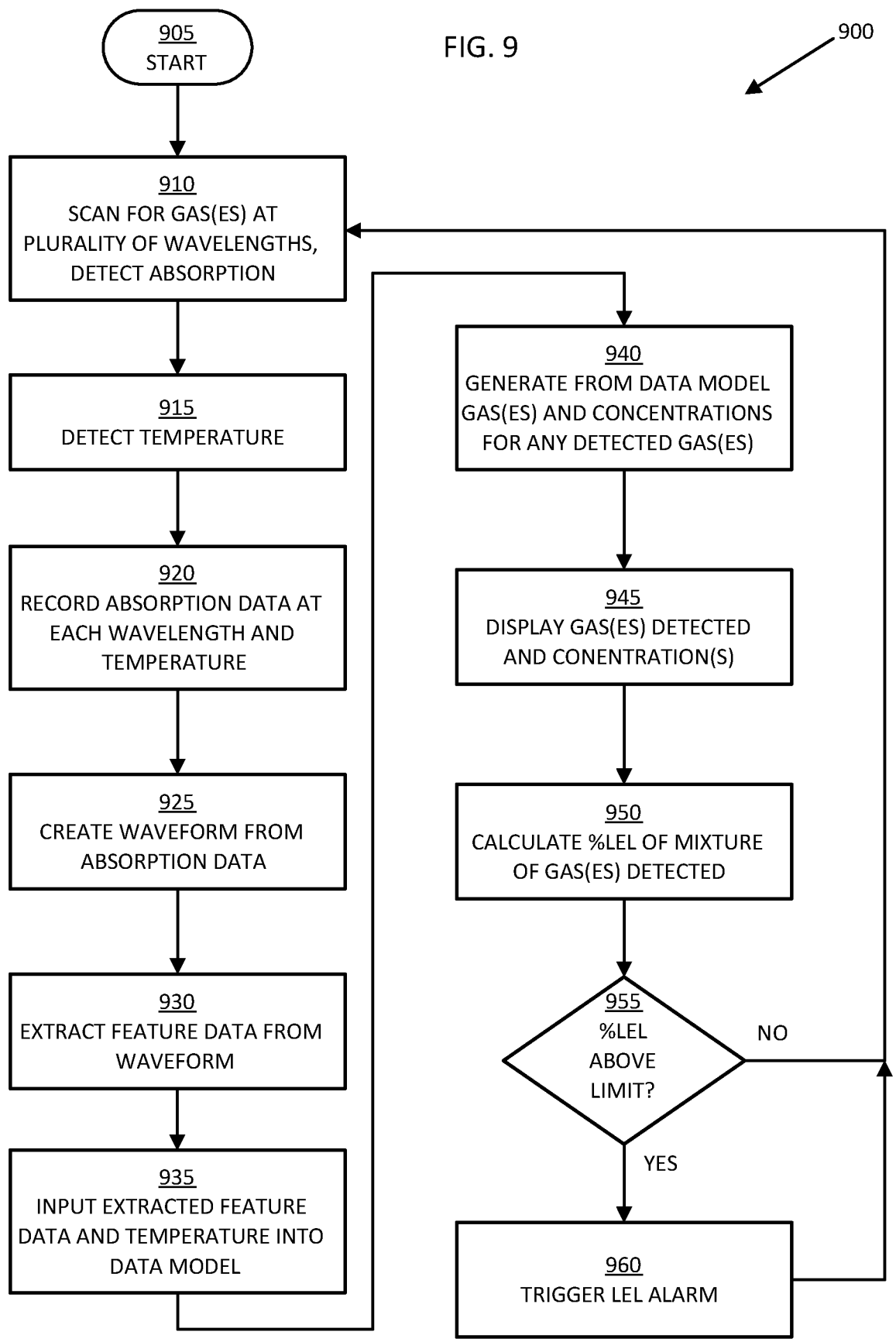
Figure 10:
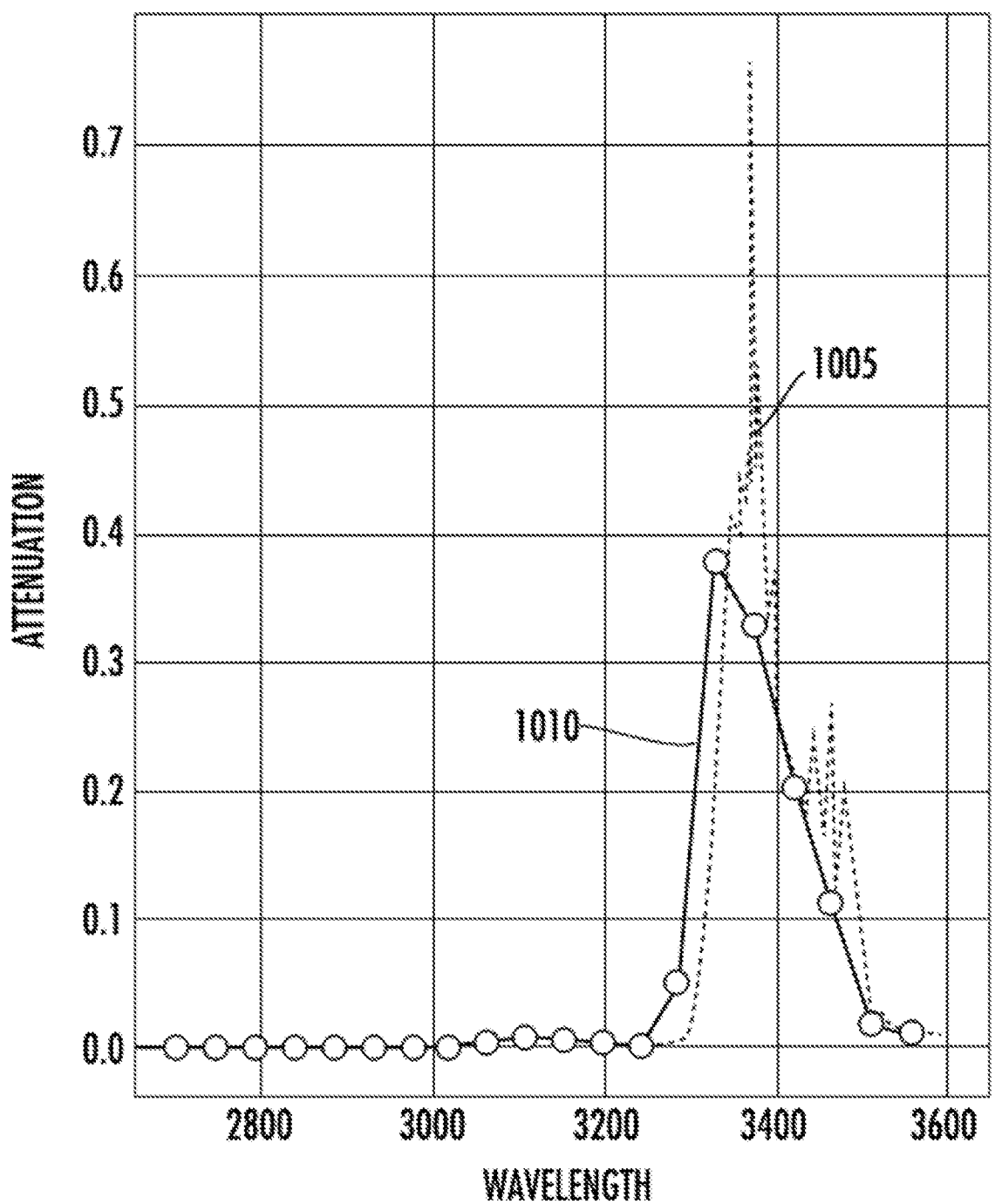
Figure 11:
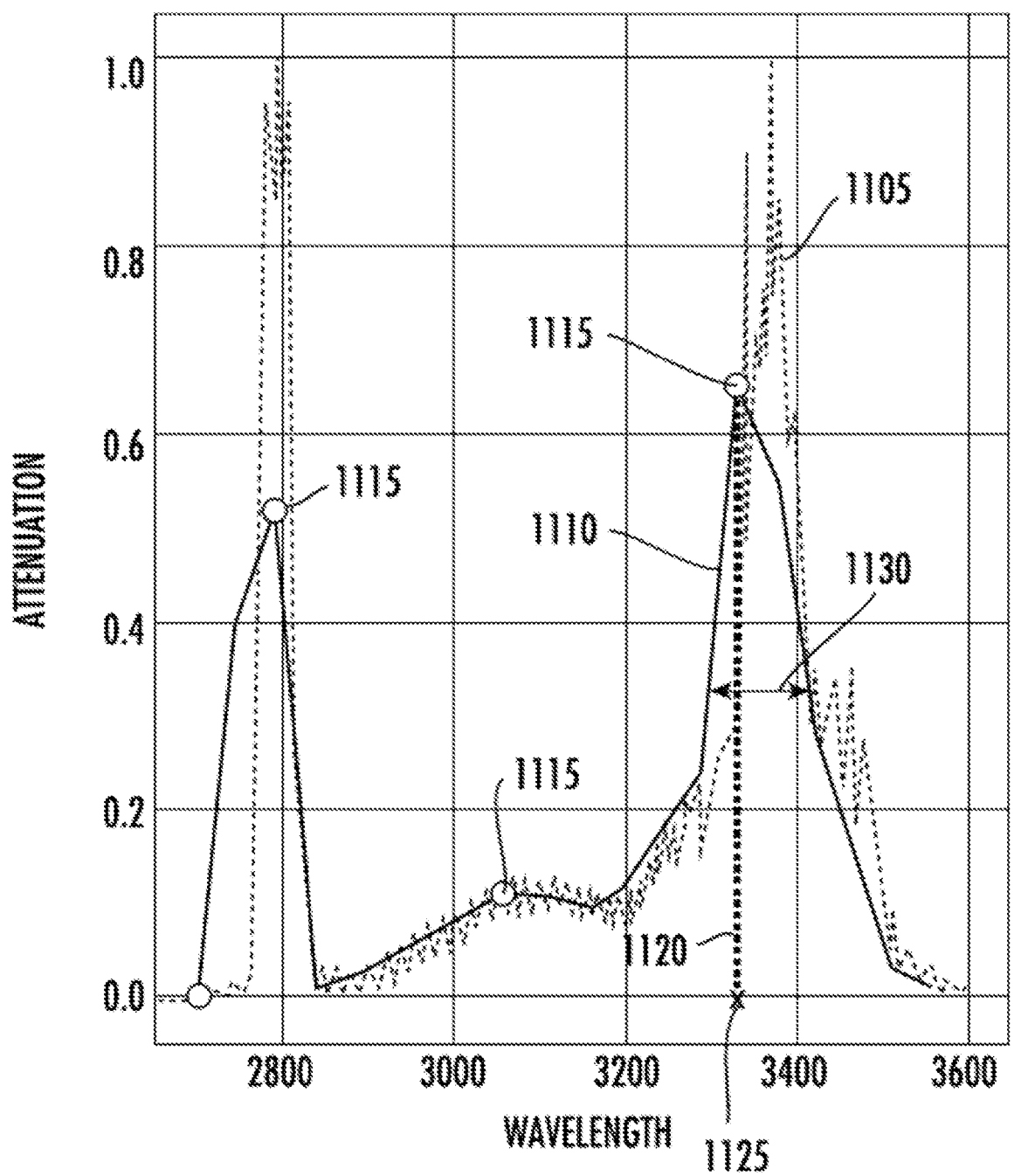
Figure 12:
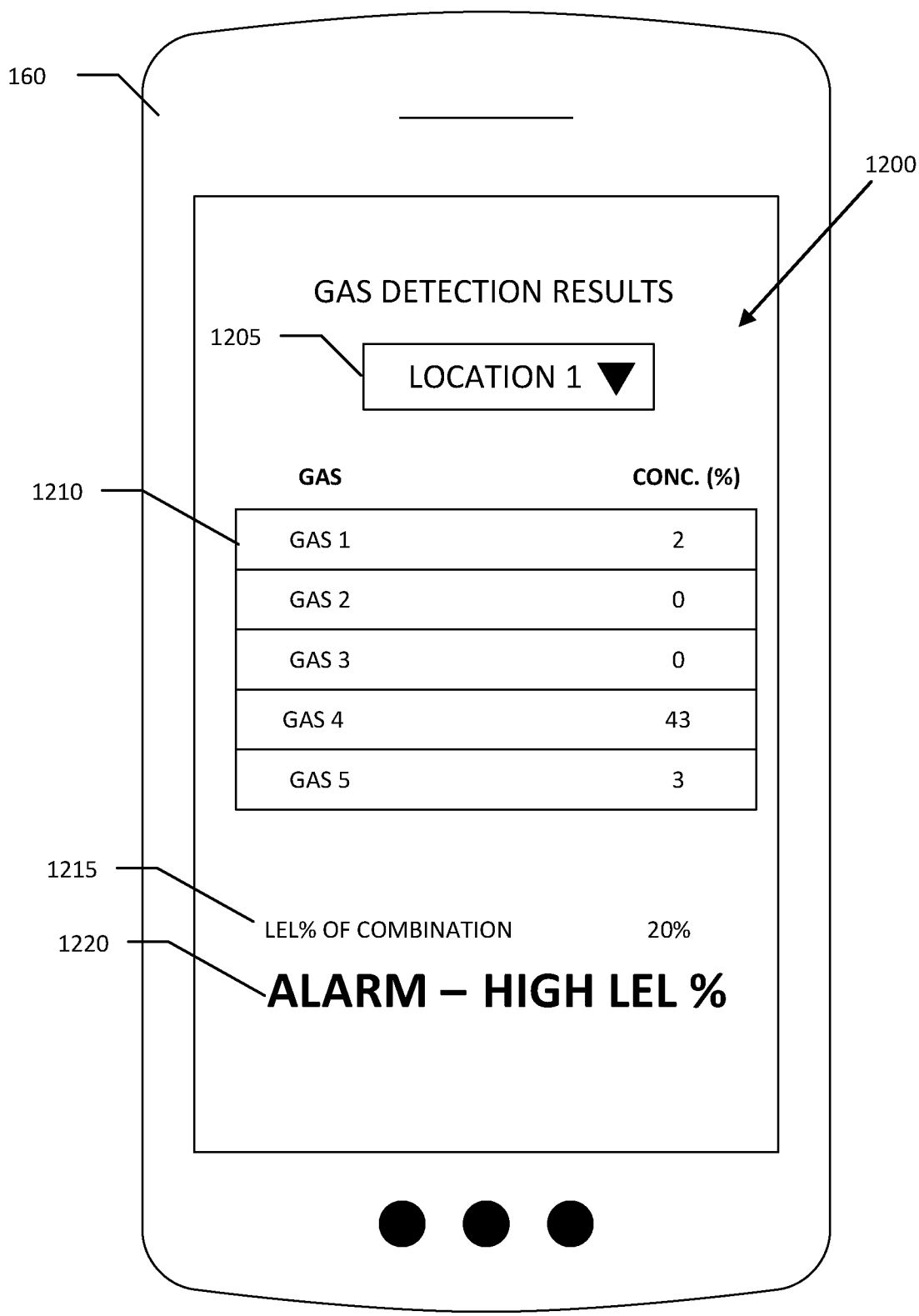

Having thus described the embodiments of the disclosure in general terms, reference now will be made to the accompanying drawings, which are not necessarily drawn to scale, and wherein:

FIG. 1 illustrates a block diagram of a system for gas detection that may be specially configured within which embodiments of the present disclosure may operate;

FIG. 2 illustrates a block diagram of an example gas scanning apparatus that may be specially configured in accordance with an example embodiment of the present disclosure;

FIG. 3 illustrates a block diagram of an example gas monitoring apparatus that may be specially configured in accordance with an example embodiment of the present disclosure;

FIG. 4 illustrates a block diagram of an example gas scanning apparatus that may be specially configured in accordance with an example embodiment of the present disclosure;

FIG. 5 illustrates a block diagram of an example gas detection data model training apparatus that may be specially configured in accordance with an example embodiment of the present disclosure;

FIG. 6 illustrates a visualization of an example computing environment for gas detection using a data model, in accordance with at least some example embodiments of the present disclosure;

FIGS. 7-9 illustrate flowcharts including operational blocks of an example process for gas detection, in accordance with at least some example embodiments of the present disclosure;

FIGS. 10 and 11 illustrate example waveforms of an example process for gas detection, in accordance with at least some example embodiments of the present disclosure; and FIG. 12 illustrates an example user interface providing gas detection results, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Embodiments of the present disclosure provide for detecting individual gas identities and concentrations in multiple different combinations of a gas mixture by scanning the gas(es) (typically at a much lower number of different wavelengths than an FTIR gas analyzer or the like) and using a data model (such as a deep neural network learning model) to analyze the features of a resulting waveform. In embodiments of the present disclosure, the data model is trained to identify a pre-selected, relatively small number of different gases (for example, ten or fewer different gases) that may be present in a specific facility/application. By limiting the number of different gases that can be detected and training a data model for all possible combinations of those gases, embodiments of the present disclosure can detect the identities and concentrations of the limited number of gases using a much lower number of wavelengths and therefore a simpler, faster gas detector than would otherwise be needed. Embodiments of the present disclosure provide for identifying individual gas identities and concentrations of any type of gas that is conventionally able to be detected by an optical infrared gas detectors, including but not limited to hydrocarbon gases. Embodiments of the present disclosure provide for identifying individual gas identities and concentrations using any suitable type of gas detectors, including but not limited to gas detectors equipped with microelectromechanical system (MEMS)-based spectrometer, MEMS FTIR spectrometer, and dual comb spectrometer. These types of gas detectors have a faster response, but lower resolution of wavelength scan (typical resolution of about 10-50 nm), than conventional FTIR gas detectors.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Referring now to the figures, FIG. 1 is an example block diagram of an example system for gas detection in accordance with example embodiments of the present disclosure. FIG. 1 illustrates an example gas detection system that monitors one or more gas detectors that scan for the presence of a small number of potentially hazardous pre-determined different gases at one or more different locations in one or more facilities to identify the presence and concentration of the pre-determined set of different gas(es). In the illustrated embodiment, the gas detection system 100 comprises a plurality of gas detectors 110 in communication with a monitoring device 130 over a network 120. In example embodiments, any suitable number of gas detectors 110 may be monitored. In the illustrated embodiment, the gas detectors 110 are labeled 1 to N to indicate the potentially varying number of gas detection devices.

In the illustrated embodiment, the gas detection system 100 further comprises a calibration gas detector 140 for scanning the small number of pre-determined different gases to enable creation of a calibration gas database and a data model training device 150 for using the calibration gas database to train a data model to detect the pre-determined set of different gases.

In the illustrated embodiment, the gas detection system 100 further comprises one or more user devices 160. The one or more user devices 160 may be associated with users of the gas detection system 100. In various embodiments, the monitoring device 130 may generate and/or transmit a message, alert, or indication to a user via a user device 160. Additionally, or alternatively, a user device 160 may be utilized by a user to remotely access a gas detector 110, a monitoring device 130, and/or or a data model training device 150. This may be by, for example, an application operating on the user device 160. A user may access a gas detector 110, a monitoring device 130, and/or or a data model training device 150 remotely, including one or more visualizations, reports, and/or real-time displays.

FIG. 2 is an example block diagram of an example gas detector 110 in accordance with example embodiments of the present disclosure. The example gas detector 110 is used for scanning the atmosphere in a facility or the like as part of the process of detecting what gas(es) are present in the facility and in what concentration(s). In an example embodiment, the gas detector 110 comprises an optical infrared gas detector. In the illustrated embodiment, the gas detector 110 comprises processing circuitry 205, communications circuitry 210, memory circuitry 215, input/output circuitry 220, gas scanning circuitry 230, and temperature sensing circuitry 235.

In an example embodiment, the processing circuitry 205 controls the operation of the gas detector 110 and its various components, typically according to configuration data and instructional programming stored in the memory circuitry 215. In an example embodiment, the gas scanning circuitry 230, in conjunction with the processing circuitry 205, optically scans the atmosphere at the location of the gas detector 110 at a plurality of predefined infrared wavelengths and detects/captures the absorption at each wavelength. In an example embodiment, the processing circuitry 205 also detects and records the temperature at the location of the gas detector 110 via the temperature sensing circuitry 235. In an example embodiment, the communications circuitry 210 enables the gas detector 110 to communicate with the monitoring device 130 to transmit the detected absorption at each wavelength and the detected temperature, such as via the network 120. In some embodiments, the gas detector 110 scans the atmosphere repeatedly at predetermined intervals, such as every five minutes. In an example embodiment, the input/output circuitry 220 enables a user to interface with the gas detector 110, such as to view a status indicator.

FIG. 3 is an example block diagram of an example monitoring device for gas detection in accordance with example embodiments of the present disclosure. The example monitoring device 130 of FIG. 3 communicates with the gas detectors 110 to receive the detected absorption at each wavelength and the detected temperature, such as via the network 120. In the illustrated embodiment, the monitoring device 130 comprises processing circuitry 305, communications circuitry 310, memory circuitry 315, input/output circuitry 320, a display 325, data processing circuitry 330, and data model inference circuitry 335.

In an example embodiment, the processing circuitry 305 controls the operation of the monitoring device 130 and its various components, typically according to configuration data and instructional programming stored in the memory circuitry 315. In an example embodiment, the communications circuitry 310 enables the monitoring device 130 to communicate with the gas detectors 110 to receive the detected absorption at each wavelength and the detected temperature, such as via the network 120. In an example embodiment, the processing circuitry 305 can, in conjunction with the data processing circuitry 330, receive the detected absorption at each wavelength, create a waveform of the detected absorption at each wavelength, and extract one or more features from the waveform, as described further below. In an example embodiment, the processing circuitry 305 can, in conjunction with the data model inference circuitry 335, apply a data model, as described further below, to the extracted feature(s) to determine the identity(ies) and concentration(s) of the detected gas(es). In an example embodiment, the processing circuitry 30, in conjunction with the data processing circuitry 330, further determines a lower explosion limit percentage (LEL %) of the identified gas mixture, compares the LEL % to a predetermined threshold, and triggers an alarm if the LEL % exceeds the predetermined threshold. In an example embodiment, the processing circuitry 305 displays the identity(ies) and concentration(s) of the detected gas(es), the determined LEL %, and/or an alarm indicating a high LEL % for one or more users to view, such as via display 325. In various examples of the present disclosure, the display 325 may include a liquid crystal display (LCD), a light-emitting diode (LED) display, a plasma (PDP) display, a quantum dot (QLED) display, and/or the like. Additionally or alternatively, in various examples of the present disclosure, such information and/or alerts related to potentially hazardous environmental conditions may be transmitted to one or more user devices 160 (e.g., mobile phone or the like) for a user to view. In an example embodiment, the input/output circuitry 320 enables a user to interact with the monitoring device 130.

In some embodiments of the invention, the functionality of the monitoring device 130 is incorporated into each of the gas detectors 110 and the monitoring device is omitted.

FIG. 4 is an example block diagram of an example calibration gas detector in accordance with example embodiments of the present disclosure. The example calibration gas detector 140 of FIG. 4 is used to scan a pre-selected, relatively small number of different gases (termed "calibration gases") to create a calibration database used to train a data model, as described further below. The gas detectors 110 and the calibration gas detector 140 function similarly and, in some embodiments, comprise the same type of gas detector. In an example embodiment, the calibration gas detector 140 comprises an optical infrared gas detector. In the illustrated embodiment, the calibration gas detector 140 comprises processing circuitry 405, communications circuitry 410, memory circuitry 415, input/output circuitry 420, gas scanning circuitry 430, and temperature setting circuitry 435.

In an example embodiment, the processing circuitry 405 controls the operation of the calibration gas detector 140 and its various components, typically according to configuration data and instructional programming stored in the memory circuitry 415. In an example embodiment, the gas scanning circuitry 430, in conjunction with the processing circuitry 405, optically scans each calibration gas at a plurality of predefined infrared wavelengths and detects/captures the absorption at each wavelength, as described further below. In some embodiments, the gas scanning circuitry 430, in conjunction with the processing circuitry 405, optically scans each calibration gas at a plurality of predefined infrared wavelengths for each of a plurality of different concentrations, typically measured as a percentage of the gas's LEL, and detects/captures the absorption at each wavelength along with the respective concentration. In some embodiments, the temperature setting circuitry 435, in conjunction with the processing circuitry 405, sets a temperature of the calibration gas to be scanned. In some embodiments, the gas scanning circuitry 430, in conjunction with the processing circuitry 405, optically scans each calibration gas at a plurality of predefined infrared wavelengths for each of a plurality of different concentrations, typically measured as a percentage of the gas's LEL, and for each of a plurality of different temperatures, and detects/captures the absorption at each wavelength along with the respective concentration and temperature. In an example embodiment, the communications circuitry 410 enables the calibration gas detector 140 to communicate with the data model training device 150 to transmit the detected absorption at each wavelength for each of the plurality of different concentrations and each of the plurality of different temperatures. In an example embodiment, the input/output circuitry 420 enables a user to interface with the calibration gas detector 140, such as to view a status indicator.

In some embodiments, the gas scanning circuitry 430, in conjunction with the processing circuitry 405, optically scans each concentration of each calibration gas at a plurality of different temperatures. In some embodiments, each concentration of each calibration gas is scanned at a relatively large number of different temperatures. In an example embodiment, each concentration of each calibration gas is scanned over a temperature range of −40 C to 40 C at 5 degree increments (i.e., 17 different temperatures). However, scanning each concentration of each calibration gas at each of such a relatively large number of different temperatures significantly increases the time and effort necessary to obtain the calibration gas data used to train the data model.

It is known that there is an inverse relationship between the infrared absorption of a gas and the temperature of the gas (i.e., the infrared absorption decreases as the temperature increases, and vice versa), and that the inverse relationship is substantially linear. As such, in some alternative embodiments, each concentration of each calibration gas is scanned at a relatively small number of different temperatures and the absorption values at a plurality of other, unscanned temperatures are interpolated/extrapolated from the absorption data at the scanned temperatures by calculating a temperature coefficient that expresses the inverse linear relationship between infrared absorption and temperature. The temperature coefficient for each different calibration gas is a constant. In an alternative example embodiment, each concentration of each calibration gas is scanned over a temperature range of −40 C to 40 C at 20 degree increments (i.e., 5 different temperatures). In such an alternative example embodiment, the absorption values at a plurality of other, unscanned temperatures of interest are interpolated/extrapolated from the absorption data at the five scanned temperatures using the temperature coefficient. In one such alternative example embodiment, the unscanned temperatures of interest (for which absorption data is interpolated using the temperature coefficient) cover the temperature range of −40 C to 40 C at 5 degree increments (not including the five scanned temperatures in that range).

FIG. 5 is an example block diagram of an example data model training device for gas detection in accordance with example embodiments of the present disclosure. The example data model training device 150 of FIG. 5 communicates with the calibration gas detector 140 to receive the detected absorption at each wavelength for each calibration gas and trains a data model to detect the identity(ies) and concentration(s) of the calibration gases when one or more of the calibration gases are present at one of the gas detectors 110. In the illustrated embodiment, the data model training device 150 comprises processing circuitry 505, communications circuitry 510, memory circuitry 515, input/output circuitry 520, data processing circuitry 530, and data model training circuitry 535.

In an example embodiment, the processing circuitry 505 controls the operation of the data model training device 150 and its various components, typically according to configuration data and instructional programming stored in the memory circuitry 515. In an example embodiment, the communications circuitry 510 enables the data model training device 150 to communicate with the calibration gas detector 140 to receive the detected absorption at each wavelength for each calibration gas. In some embodiments, the data model training device 150 receives the detected absorption at each wavelength for each concentration and/or for each temperature of the calibration gas. In some embodiments, the data model training device 150 receives the detected absorption at each wavelength for a relatively small number of different temperatures (e.g., five different temperatures), calculates a temperature coefficient that expresses the inverse linear relationship between absorption and temperature, and uses the temperature coefficient to determine, via the data processing circuitry 530, the absorption at each wavelength for other, unscanned temperatures.

In an example embodiment, the processing circuitry 505, in conjunction with the data processing circuitry 530, creates a waveform of the detected absorption at each wavelength for every possible combination of calibration gas, concentration, and temperature (both scanned and interpolated/extrapolated). The number of different possible combinations can be calculated by raising the number of different concentrations to the power of the number of different calibration gases multiplied by the number of different temperatures. In an example embodiments with five different calibration gases, eleven different concentrations (0% LEL through 100% LEL in 10% increments), and seventeen different temperatures (−40 C through 40 C in 5 degree increments), there are 2,737,867 ($11^5 \times 17$) possible combinations and as many different waveforms.

In an example embodiment, the processing circuitry 505, in conjunction with the data processing circuitry 530, extracts one or more features from each of the created waveforms, as described further below. In an example embodiment, the extracted feature(s) used to train the data model are the same types of extracted feature(s) that are input by the monitoring device 130 into the trained data model. In an example embodiment, the processing circuitry 505 inputs the extracted features for each waveform into the data model training circuitry 535, maintaining the relationship between the extracted features of each waveform and the specific calibration gases, concentrations, and temperatures associated with each waveform. In an example embodiment, the data model training circuitry 535 uses the extracted features to train a data model to determine the identity(ies) and concentration(s) of an unknown gas or combination of gases (as long as the unknown gas(es) are the same as or a subset of the calibration gases).

The input/output circuitry 520 enables a user to interact with the data model training device 150.

In some embodiments of the invention, the functionality of the monitoring device 130 and the functionality of the data model training device 150 are combined into a single device.

The gas detectors 110, the monitoring device 130, the calibration gas detector 140, and/or the data model training device 150 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

The use of the term "circuitry" as used herein with respect to components of the apparatuses should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the gas detection system 100 may provide or supplement the functionality of particular circuitry. For example, the processing circuitry 205, 305, 405, 505 may provide processing functionality, the communications circuitry 210, 310, 410, 510 may provide network interface functionality, the memory circuitry 215, 315, 415, 515 may provide storage functionality, and the like.

In some embodiments, the processing circuitry 205, 305, 405, 505 (and/or co-processor or any other processing circuitry assisting or otherwise associated with the processor) may be in communication with, respectively, the memory circuitry 215, 315, 415, 515 via a bus for passing information among components of the apparatus. The processing circuitry 205, 305, 405, 505 may be embodied in a number of different ways and may, for example, include one or more processing devices configured to perform independently. Additionally, or alternatively, the processing circuitry 205, 305, 405, 505 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

For example, the processing circuitry 205, 305, 405, 505 may be embodied as one or more complex programmable logic devices (CPLDs), microprocessors, multi-core processors, co-processing entities, application-specific instruction-set processors (ASIPs), and/or controllers. Further, the processing circuitry 205, 305, 405, 505 may be embodied as one or more other processing devices or circuitry. The term circuitry may refer to an entirely hardware embodiment or a combination of hardware and computer program products. Thus, the processing circuitry 205, 305, 405, 505 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing circuitry 205, 305, 405, 505 may be configured for a particular use or configured to execute instructions stored in volatile or non-volatile media or otherwise accessible to the processing circuitry 205, 305, 405, 505. As such, whether configured by hardware or computer program products, or by a combination thereof, the processing circuitry 205, 305, 405, 505 may be capable of performing steps or operations according to embodiments of the present disclosure when configured accordingly.

In an example embodiment, the processing circuitry 205, 305, 405, 505 may be configured to execute instructions stored, respectively, in the memory circuitry 215, 315, 415, 515 or otherwise accessible to the processor. Alternatively, or additionally, the processing circuitry 205, 305, 405, 505 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processing circuitry 205, 305, 405, 505 is embodied as an executor of software instructions, the instructions may specifically configure the processor to perform the algorithms and/or operations described herein when the instructions are executed.

In some embodiments, the memory circuitry 215, 315, 415, 515 may further include or be in communication with volatile media (also referred to as volatile storage, memory, memory storage, memory circuitry and/or similar terms used herein interchangeably). In some embodiments, the volatile storage or memory may also include, such as but not limited to, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the memory circuitry 215, 315, 415, 515 may be used to store at least portions of the databases, database instances, database management system entities, data, applications, programs, program modules, scripts, source code, object code, byte code, compiled code, interpreted code, machine code, executable instructions, and/or the like being executed by, respectively, for example, the processing circuitry 205, 305, 405, 505 as shown in FIGS. 2-5. Thus, the databases, database instances, database management system entities, data, applications, programs, program modules, scripts, source code, object code, byte code, compiled code, interpreted code, machine code, executable instructions, and/or the like may be used to control certain aspects of the operation of the gas detectors 110, the monitoring device 130, the calibration gas detector 140, and/or the data model training device 150 with the assistance of, respectively, the processing circuitry 205, 305, 405, 505 and operating system.

In some embodiments, the memory circuitry 215, 315, 415, 515 may further include or be in communication with non-volatile media (also referred to as non-volatile storage, memory, memory storage, memory circuitry and/or similar terms used herein interchangeably). In some embodiments, the memory circuitry 215, 315, 415, 515 may include, such as, but not limited to, hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the memory circuitry 215, 315, 415, 515 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In various embodiments of the present disclosure, the memory circuitry 215, 315, 415, 515 may also be embodied as a data storage device or devices, as a separate database server or servers, or as a combination of data storage devices and separate database servers. Further, in some embodiments, memory circuitry 215, 315, 415, 515 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, memory circuitry 215, 315, 415, 515 may encompass one or more data stores configured to store information/data usable in certain embodiments.

In the example as shown in FIGS. 2-5, one or more instances of circuitry may be part of the memory circuitry 215, 315, 415, 515. In this example, the term "circuitry" refers to one or more data storage units in the memory circuitry 215, 315, 415, 515 that may store executable computer program instructions. When the executable computer program instructions stored in such circuitry are executed by a processing circuitry (such as, but not limited to, the processing circuitry 205, 305, 405, 505 shown in FIGS. 2-5), the executable computer program instructions may cause the processing circuitry to perform one or more functions.

The communications circuitry 210, 310, 410, 510 may be any means such as a device or circuitry embodied in either hardware or a combination of hardware and software that is configured to receive and/or transmit data from/to a network and/or any other device, circuitry, or module in communication with, respectively, the gas detectors 110, the monitoring device 130, the calibration gas detector 140, and/or the data model training device 150. In this regard, the communications circuitry 210, 310, 410, 510 may include, for example, a network interface for enabling communications with a wired or wireless communication network and/or in accordance with a variety of networking protocols described herein. For example, the communications circuitry 210, 310, 410, 510 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of the gas detectors 110, the monitoring device 130, the calibration gas detector 140, and/or the data model training device 150. In some embodiments, one or more external systems (such as a remote cloud computing and/or data storage system) may also be leveraged to provide at least some of the functionality discussed herein.

FIG. 1 depicts a monitoring device 130 in communication with multiple gas detectors 110 and with a data model training device 150. In some embodiments, the monitoring device 130, the data model training device 150, and/or the gas detectors 110 are configured to communicate with each other directly or indirectly through direct communication with another device (e.g., a controller). In other embodiments, for example as depicted, the monitoring device 130, the data model training device 150, and/or the gas detectors 110 are configured to communicate with each other over a communications network 120.

The communications network 120 may embody any of a myriad of network(s) configured to enable communication between two or more computing device(s). In some embodiments, the communications network 120 embodies a private network. For example, the monitoring device 130 and/or the data model training device 150 may be embodied by various computing device(s) on an internal network, such as one or more server(s) of a facility in communication with the various gas detectors 110 positioned at various locations in the facility.

In other embodiments, the communications network 120 embodies a public network, for example the Internet. In some such embodiments, the monitoring device 130 and/or the data model training device 150 may embody a remote or "cloud" system that accesses the gas detectors 110 over the communications network 120 from a location separate from the physical location of the gas detectors 110. For example, the monitoring device 130 and/or the data model training device 150 may be embodied by computing device(s) of a central headquarters, central monitoring facility, server farm, distributed platform, and/or the like. In some such embodiments, the monitoring device 130 and/or the data model training device 150 may be accessed directly (e.g., via a display and/or peripherals operatively engaged with the monitoring device 130 and/or the data model training device 150), and/or may be accessed indirectly through use of a client device. For example, in some embodiments, a user may login (e.g., utilizing a username and password) or otherwise access the monitoring device 130 and/or the data model training device 150 to access the described functionality with respect to one or more particular facilities.

In some embodiments, the input/output circuitry 220, 320, 420, 520 may be in communication with, respectively, the processing circuitry 205, 305, 405, 505 to provide output to the user and, in some embodiments, to receive an indication of a user input. The input/output circuitry 220, 320, 420, 520 may include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory circuitry 215, 315, 415, 515, and/or the like).

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

FIG. 6 illustrates a visualization of an example computing environment for gas detection using a data model, in accordance with at least some example embodiments of the present disclosure. In this regard, the example computing environments and various data described associated therewith may be maintained by one or more computing devices, such as the model training device 150 and/or the monitoring device 130. The model training device 150 and/or the monitoring device 130 (alone or in combination), for example, may be specially configured via hardware, software, firmware, and/or a combination thereof, to perform the various data processing and interactions described with respect to FIG. 6 to identify one or more unknown gases and their concentration(s) from data associated a predefined set of calibration gases.

The example computing environment 600 of FIG. 6 comprises one or more data models for identifying one or more unknown gases and their concentration(s), as long as the unknown gas(es) comprise one or more of the calibration gases used to train the data model(s). In an example embodiment, a gas detection model 605 uses waveform features extracted from the scanning of a predefined set of calibration gases to identify the presence and concentration(s) of one or more of those calibration gases, such as in a facility where the presence of such gases may pose an explosion risk or some other hazard. In some embodiments, the gas detection model 605 comprises any suitable artificial intelligence deep learning model. In one example embodiment, the gas detection model 605 comprises a random forest classifier.

The gas detection model 605 has a training portion 610 and an inference or detection portion 615. In an example embodiment, waveform features 620 extracted from the scanning of a predefined set of calibration gases, including data from combinations of a plurality of different concentrations and/or a plurality of different temperatures of the calibration gases, are input to the training portion 610 in order to train the gas detection model 605 to identify one or more unknown gases and their concentration(s) from the set of gases that comprise the calibration gases. A product of the model training portion 610 are trained model weights 625 that are used by the inference or detection portion 615 of the gas detection model 605.

In some embodiments, after the data model has been trained, waveform features 630 extracted from the scanning of the atmosphere surrounding a gas detector, such as gas detector 110, are input into the inference portion 615 of the gas detection model 605. By receiving the waveform features 630 extracted from the scanning of the atmosphere surrounding a gas detector, the inference portion 615 of the gas detection model 605 outputs the identity(ies) and concentration(s) of the detected gas(es) 635.

Having described example systems, apparatuses, computing environments, and user interfaces associated with embodiments of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternative, any of the processes may include some or all of the steps described and/or depicted, including one or more optional operational blocks in some embodiments. In regard to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 7 illustrates a flowchart including operational blocks of an example process for creating a calibration gas database for gas detection, in accordance with at least some example embodiments of the present disclosure. Specifically, FIG. 7 depicts operations of an example process 700. In some embodiments, the computer-implemented process 700 is embodied by computer program code stored on a non-transitory computer-readable medium of a computer program product configured for execution to perform the computer-implemented method. Alternatively or additionally, in some embodiments, the example process 700 is performed by one or more specially configured computing devices, such as the calibration gas detector 140. In this regard, in some such embodiments, the calibration gas detector 140 is specially configured by computer program instructions stored thereon, for example in the memory circuitry 415 and/or another component depicted and/or described herein, and/or otherwise accessible to the calibration gas detector 140, for performing the operations as depicted and described with respect to the example process 700. In some embodiments, the specially configured calibration gas detector 140 includes and/or otherwise is in communication with one or more external apparatuses, systems, devices, and/or the like, to perform one or more of the operations as depicted and described.

The process 700 begins at step/operation 705. At step/operation 710, a processor (such as, but not limited to, the processing circuitry 405 of the calibration gas detector 140 described above in connection with FIG. 4) selects a first gas to be scanned for a calibration gas database for the first pass through the process 700 or a next gas to be scanned for a calibration gas database for subsequent passes through the process 700. In an example embodiment, the calibration gases comprise a small number (typically fewer than ten, and preferably about five or six) of gases that have been identified by a user as the most likely to be detected (or to otherwise be of concern) at the location(s) of the gas detector(s) 110. By limiting the number of calibration gases and correspondingly the number of gases that can be detected by the gas detection system 100 to such a small number and by using a trained data model, it is possible to detect the presence and concentration(s) of this small number of gases using a gas detector that scans at far fewer wavelengths than a gas detector that is capable of detecting a larger number of different gases (for example, an FTIR gas analyzer or the like, which typically scans at 1500 wavelengths or more (sometimes as many as 9000 wavelengths)) and is therefore significantly less complex and faster.

In some alternative embodiments, the process 700 may be implemented for a large number of different gases to create a calibration gas "library" of all or many gases which may need to be detected in all or many facilities/locations/applications. The specific smaller number of gases of interest for a particular facility/location/application may then be selected from the calibration gas library as needed.

At step/operation 715, a processor (such as, but not limited to, the processing circuitry 405 and/or the gas scanning circuitry 430 of the calibration gas detector 140 described above in connection with FIG. 4) scans the selected gas at each of a predetermined plurality of infrared wavelengths. In some embodiments, the number of and specific wavelengths at which the gases are scanned may vary, and any suitable number of and specific wavelengths may be used. The number of wavelengths selected involves a trade-off between detection accuracy and the speed/cost/complexity of the gas detectors 110. Increasing the number of wavelengths at which the gases are scanned increases the accuracy of gas detection but may increase the cost and complexity and decrease the speed, while decreasing the number of wavelengths decreases the accuracy but may decrease the cost and complexity and increase the speed. Therefore, in some embodiments the number of different wavelengths is selected to provide the desired accuracy of gas detection and the desired speed/cost/complexity of gas detector. In some embodiments, the number of different wavelengths will be between 70 and 200. In some embodiments, the different wavelengths will be evenly spaced over a predetermined infrared range. In some embodiments, the predetermined infrared range is 2700-3700 nanometers.

FIG. 10 illustrates example waveforms showing how scanning a gas at a lower number of different wavelengths can provide a reasonable approximation of a scan at a much higher number of different wavelengths. Specifically, FIG. 10 shows propane gas scanned at 9000 different wavelengths to produce waveform 1005 (in dashed line), and propane gas scanned at 20 different wavelengths (which is a lower number of different wavelengths than is likely to be used in an actual implementation of embodiments of the disclosure) to produce waveform 1010 (in solid line). In some embodiments using, for example, between 70 and 200 different wavelengths, the resulting waveform will be an even closer approximation of a scan taken at a much higher number of different wavelengths, thereby providing the desired accuracy of gas detection and the desired speed/cost/complexity of gas detector.

Returning to FIG. 7, at step/operation 720, a processor (such as, but not limited to, the processing circuitry 405 of the calibration gas detector 140 described above in connection with FIG. 4) detects and records the absorption of infrared light by the selected gas at each of a predetermined plurality of infrared wavelengths.

As described above, in some embodiments each calibration gas is scanned at a plurality of different temperatures. In such embodiments, at step/operation 725, a processor (such as, but not limited to, the processing circuitry 405 of the calibration gas detector 140 described above in connection with FIG. 4) determines if the selected gas has been scanned at all the desired temperatures. If it is determined at step/operation 725 that the selected calibration gas has not been scanned at all the desired temperatures, at step/operation 730, a processor (such as, but not limited to, the processing circuitry 405 and/or the temperature setting circuitry 435 of the calibration gas detector 140 described above in connection with FIG. 4) increases the temperature of the selected calibration gas and repeats steps/operations 715-725 until the selected calibration gas has been scanned at all the desired temperatures. In an example embodiment, each calibration gas is scanned from −40 C to 40 C in 5 degree increments (that is, 17 different temperatures). In an alternative example embodiment, each calibration gas is scanned from −40 C to 40 C in 20 degree increments, and a temperature coefficient is calculated to determine the absorption values at a plurality of other, unscanned temperatures such as from −40 C to 40 C in 5 degree increments.

As described above, in some embodiments each calibration gas is scanned at a plurality of different concentrations. In such embodiments, at step/operation 735, a processor (such as, but not limited to, the processing circuitry 405 of the calibration gas detector 140 described above in connection with FIG. 4) determines if the selected gas has been scanned at all the desired concentrations. If it is determined at step/operation 735 that the selected calibration gas has not been scanned at all the desired concentrations, at step/operation 740, a processor (such as, but not limited to, the processing circuitry 405 of the calibration gas detector 140 described above in connection with FIG. 4) increases the concentration of the selected calibration gas and repeats steps/operations 715-735 until the selected calibration gas has been scanned at all the desired concentrations. In an example embodiment, each calibration gas is scanned at concentrations of 10% LEL to 100% LEL, in 10% increments (that is, the gas is scanned at 10 different concentrations, but the calibration gas database may also include 0% LEL concentration for a total of 11 different concentrations).

At step/operation 745, a processor (such as, but not limited to, the processing circuitry 405 of the calibration gas detector 140 described above in connection with FIG. 4) determines if all of the gases to be included in the calibration gas database have been scanned. If all of the gases to be included in the calibration gas database have not been scanned, the process 700 returns to step/operation 710, the next gas to be scanned is selected, and the process 700 is repeated until it is determined at step/operation 745 that all of the gases to be included in the calibration gas database have been scanned. If it is determined at step/operation 745 that all of the gases to be included in the calibration gas database have been scanned, the process 700 ends at step/operation 750.

FIG. 8 illustrates a flowchart including operational blocks of an example process for training a data model for gas detection, in accordance with at least some example embodiments of the present disclosure. Specifically, FIG. 8 depicts operations of an example process 800. In some embodiments, the computer-implemented process 800 is embodied by computer program code stored on a non-transitory computer-readable medium of a computer program product configured for execution to perform the computer-implemented method. Alternatively or additionally, in some embodiments, the example process 800 is performed by one or more specially configured computing devices, such as the data model training device 150. In this regard, in some such embodiments, the data model training device 150 is specially configured by computer program instructions stored thereon, for example in the memory circuitry 515 and/or another component depicted and/or described herein, and/or otherwise accessible to the data model training device 150, for performing the operations as depicted and described with respect to the example process 800. In some embodiments, the specially configured data model training device 150 includes and/or otherwise is in communication with one or more external apparatuses, systems, devices, and/or the like, to perform one or more of the operations as depicted and described.

The process 800 begins at step/operation 805. At step/operation 810, a processor (such as, but not limited to, the processing circuitry 505 of the data model training device 150 described above in connection with FIG. 5) determines which specific gases are to be detected, and for which, therefore, a data model should be trained to detect. In some embodiments, these gases to be detected are the same gases that have been identified by a user as the most likely to be detected (or to otherwise be of concern) at the location(s) of the gas detector(s) 110 and that have been scanned to create the calibration gas database as described above in connection with FIG. 7. In some alternative embodiments, these gases to be detected have been identified by a user as the most likely to be detected (or to otherwise be of concern) at the location(s) of the gas detector(s) 110 and are a subset of the gases that have been scanned to create the calibration gas library as described above in connection with FIG. 7.

At step/operation 815, a processor (such as, but not limited to, the processing circuitry 505 and/or the data processing circuitry 530 of the data model training device 150 described above in connection with FIG. 5) extracts the absorption data for each of the gases to be detected from the calibration gas database described above in connection with FIG. 7. In some alternative embodiments, a processor (such as, but not limited to, the processing circuitry 505 and/or the data processing circuitry 530 of the data model training device 150 described above in connection with FIG. 5) extracts the absorption data for each of the identified subset of the gases that have been scanned to create the calibration gas library described above in connection with FIG. 7.

At step/operation 820, a processor (such as, but not limited to, the processing circuitry 505 and/or the data processing circuitry 530 of the data model training device 150 described above in connection with FIG. 5) uses the absorption data extracted at step/operation 815 to determine absorption data for each possible combination of the specific gases determined at step/operation 810 at each different concentration included in the calibration gas database and at each different temperature (which may include temperatures at which each calibration gas was scanned and, in some embodiments, may further include temperatures for which the absorption data was interpolated/extrapolated) included in the calibration gas database. As described above, the number of different possible combinations can be calculated by raising the number of different concentrations to the power of the number of different calibration gases multiplied by the number of different temperatures.

Table 1 below is an excerpt of a matrix showing the possible combinations of gases, concentrations, and temperatures of an example embodiments with five different calibration gases, eleven different concentrations (0% LEL through 100% LEL in 10% increments), and seventeen different temperatures (−40 C through 40 C in 5 degree increments, although Table 1 includes only a single temperature for simplicity), for which absorption data is determined from the absorption data for each individual calibration gas. Table 1 is not meant to imply that each possible combination of the specific gases determined at step/operation 810 at each different concentration and at each different temperature is separately scanned. Rather, Table 1 illustrates, for one example embodiment, the very large number of possible different combinations of gas, concentration, and temperature for which absorption data may be derived from the absorption data for each individual calibration gas.

TABLE 1

| Gas 1 Conc. (% LEL) | Gas 2 Conc. (% LEL) | Gas 3 Conc. (% LEL) | Gas 4 Conc. (% LEL) | Gas 5 Conc. (% LEL) | Temp. |
|---|---|---|---|---|---|
| 0 | 0 | 0 | 0 | 0 | −40 |
| 0 | 0 | 0 | 0 | 10 | −40 |
| 0 | 0 | 0 | 0 | 20 | −40 |
| 0 | 0 | 0 | 0 | 30 | −40 |
| 0 | 0 | 0 | 0 | 40 | −40 |
| 0 | 0 | 0 | 0 | 50 | −40 |
| 0 | 0 | 0 | 0 | 60 | −40 |
| 0 | 0 | 0 | 0 | 70 | −40 |
| 0 | 0 | 0 | 0 | 80 | −40 |
| 0 | 0 | 0 | 0 | 90 | −40 |
| 0 | 0 | 0 | 0 | 100 | −40 |
| 0 | 0 | 0 | 10 | 0 | −40 |
| 0 | 0 | 0 | 10 | 10 | −40 |
| 0 | 0 | 0 | 10 | 20 | −40 |
| 0 | 0 | 0 | 10 | 30 | −40 |
| 0 | 0 | 0 | 10 | 40 | −40 |
| 0 | 0 | 0 | 10 | 50 | −40 |
| 0 | 0 | 0 | 10 | 60 | −40 |
| 0 | 0 | 0 | 10 | 70 | −40 |
| 0 | 0 | 0 | 10 | 80 | −40 |
| 0 | 0 | 0 | 10 | 90 | −40 |
| 0 | 0 | 0 | 10 | 100 | −40 |
| . | . | . | . | . | . |
| . | . | . | . | . | . |
| 0 | 100 | 100 | 100 | 100 | −40 |
| 10 | 100 | 100 | 100 | 100 | −40 |
| 20 | 100 | 100 | 100 | 100 | −40 |
| 30 | 100 | 100 | 100 | 100 | −40 |
| 40 | 100 | 100 | 100 | 100 | −40 |
| 50 | 100 | 100 | 100 | 100 | −40 |
| 60 | 100 | 100 | 100 | 100 | −40 |
| 70 | 100 | 100 | 100 | 100 | −40 |
| 80 | 100 | 100 | 100 | 100 | −40 |
| 90 | 100 | 100 | 100 | 100 | −40 |
| 100 | 100 | 100 | 100 | 100 | −40 |

In this example embodiment illustrated in Table 1, there are 161,051 different gas concentration combinations for each temperature. Combining those combinations with each different temperature results in 2,737,867 possible combinations (and as many different waveforms), as described above. An absorption value at each wavelength is determined for each of these possible combinations of gas, concentration, and temperature using the absorption values for each individual calibration gas. Specifically, for each combination of gas, concentration, and temperature, the individual absorption values of each individual calibration gas at each wavelength are summed. In an example embodiment with 2,737,867 possible combinations and using 150 wavelengths for gas scanning, there would be a total of 410,680,050 absorption value data points to be analyzed.

Returning to FIG. 8, at step/operation 825, a processor (such as, but not limited to, the processing circuitry 505 and/or the data processing circuitry 530 of the data model training device 150 described above in connection with FIG. 5) uses the absorption data for each possible combination determined at step/operation 820 to create waveforms for each possible combination of the specific gases determined at step/operation 810 at each different concentration included in the calibration gas database and at each different temperature included in the calibration gas database. In an example embodiment with five different calibration gases, eleven different concentrations, and seventeen different temperatures, there are 2,737,867 possible combinations and therefore 2,737,867 waveforms would be created at step/operation 825.

FIG. 11 illustrates example waveforms for one specific combination of gases, concentrations, and temperature. Specifically, FIG. 11 shows a waveform 1105 (in dashed line) for a combination of propane gas at a concentration of 40% LEL and acetic acid at a concentration of 80% LEL, at a specific temperature (the exact temperature value is immaterial for this example), that was conventionally scanned at 9000 different wavelengths. FIG. 11 further shows a waveform 1110 (in solid line) that was created by combining the individual absorption data for propane gas at a concentration of 40% LEL and the individual absorption data for acetic acid at a concentration of 80% LEL, both at the same specific temperature (again, the exact temperature value is immaterial for this example), at 20 different wavelengths from a calibration gas database. As with FIG. 10, the example waveforms of FIG. 11 show how scanning a gas at a lower number of different wavelengths can provide a reasonable approximation of a scan at a much higher number of different wavelengths. Again, in some embodiments using, for example, between 70 and 200 different wavelengths, the resulting combination waveform will be an even closer approximation of a scan at a much higher number of different wavelengths, thereby providing the desired accuracy of gas detection and the desired speed/cost/complexity of gas detector.

Returning to FIG. 8, at step/operation 830, a processor (such as, but not limited to, the processing circuitry 505 and/or the data processing circuitry 530 of the data model training device 150 described above in connection with FIG. 5) extracts data related to one or more features from each waveform created at step/operation 825. In some embodiments, the features extracted from the waveforms include one or more of the following: number of peaks (such as peaks 1115), absorption value 1120 at tallest peak, absorption values at all peaks, location (i.e., wavelength) 1125 of tallest peak, location (i.e., wavelength) of all peaks, area under the curve (i.e., the waveform), full width at half maximum (FWHM) 1130 of the peaks, point at which attenuation starts, and wavelength zones with zero absorption.

In the example described above in which there are 2,737,867 waveforms created at step/operation 825, if five feature values are extracted at step/operation 830 for each waveform, this would result in 13,689,335 data points to be analyzed. At step/operation 835, a processor (such as, but not limited to, the processing circuitry 505 and/or the data processing circuitry 530 of the data model training device 150 described above in connection with FIG. 5) creates a data model training database comprising the feature values extracted at step/operation 830, maintaining the relationship between the extracted features of each waveform and the specific calibration gases, concentrations, and temperatures associated with each waveform.

At step/operation 840, a processor (such as, but not limited to, the processing circuitry 505 and/or the data model training circuitry 535 of the data model training device 150 described above in connection with FIG. 5) inputs the data model training database into a data model (such as a random forest classifier) to train the data model to detect the identity(ies) and concentration(s) of any of the calibration gases when one or more of the calibration gases are present at one of the gas detectors 110. The process 800 ends at step/operation 850.

FIG. 9 illustrates a flowchart including operational blocks of an example process for detecting the identity(ies) and concentration(s) of any of the calibration gases when one or more of the calibration gases are present at one of the gas detectors 110 using a trained data model for gas detection, in accordance with at least some example embodiments of the present disclosure. Specifically, FIG. 9 depicts operations of an example process 900. In some embodiments, the computer-implemented process 900 is embodied by computer program code stored on a non-transitory computer-readable medium of a computer program product configured for execution to perform the computer-implemented method. Alternatively or additionally, in some embodiments, the example process 900 is performed by one or more specially configured computing devices, such as the monitoring device 130. In this regard, in some such embodiments, the monitoring device 130 is specially configured by computer program instructions stored thereon, for example in the memory circuitry 315 and/or another component depicted and/or described herein, and/or otherwise accessible to the monitoring device 130, for performing the operations as depicted and described with respect to the example process 900. In some embodiments, the specially configured monitoring device 130 includes and/or otherwise is in communication with one or more external apparatuses, systems, devices, and/or the like, to perform one or more of the operations as depicted and described.

The process 900 begins at step/operation 905. At step/operation 910, a processor (such as, but not limited to, the gas scanning circuitry 230 of the gas detector 110 described above in connection with FIG. 2) scans the atmosphere in and/or around the gas detector 110 at a plurality of wavelengths and detects the absorption at each wavelength. In some embodiments, the gas detector 110 scans at the same wavelengths as were used to train the data model at step/operation 840 of as described above in connection with FIG. 8.

At step/operation 915, a processor (such as, but not limited to, the temperature sensing circuitry 235 of the gas detector 110 described above in connection with FIG. 2) detects the temperature at the location of the gas detector 110.

At step/operation 920, a processor (such as, but not limited to, the processing circuitry 305 of the monitoring device 130 described above in connection with FIG. 3) receives the absorption data for each wavelength and the temperature from the gas detector 110 and records the absorption data and the temperature.

At step/operation 925, a processor (such as, but not limited to, the data processing circuitry 330 of the monitoring device 130 described above in connection with FIG. 3) creates a waveform from the recorded absorption data for each wavelength received from the gas detector 110. In an example embodiment, the created waveform may resemble the waveform 1110 of FIG. 11.

At step/operation 930, a processor (such as, but not limited to, the data processing circuitry 330 of the monitoring device 130 described above in connection with FIG. 3) extracts one or more features from the waveform created at step/operation 925. In some embodiments, the features extracted at step/operation 930 are the same type of features as were used to train the data model at step/operation 840 of as described above in connection with FIG. 8.

At step/operation 935, a processor (such as, but not limited to, the data processing circuitry 330 and/or the data model inference circuitry 335 of the monitoring device 130 described above in connection with FIG. 3) inputs the features extracted at step/operation 930 into the data model trained at step/operation 840 of as described above in connection with FIG. 8.

At step/operation 940, a processor (such as, but not limited to, the data model inference circuitry 335 of the monitoring device 130 described above in connection with FIG. 3) uses the trained data model to analyze the features extracted at step/operation 930 and the temperature detected as step/operation 915 to identify the gas(es) and concentration(s) of the gas(es) scanned by the gas detector 110 at step/operation 910. In some embodiments, the concentration(s) are expressed as an LEL %.

At step/operation 945, a processor (such as, but not limited to, the processing circuitry 305 of the monitoring device 130 described above in connection with FIG. 3) displays the gas(es) and concentration(s) of the gas(es) identified at step/operation 940. In some embodiments, the gas(es) and concentration(s) of the gas(es) identified at step/operation 940 are transmitted to one or more user devices 160 (e.g., mobile phone or the like) to be displayed for a user to view.

At step/operation 950, a processor (such as, but not limited to, the data processing circuitry 330 of the monitoring device 130 described above in connection with FIG. 3) calculates the LEL % of the combination of gases identified at step/operation 940. In some embodiments, the LEL % of the identified combination of gases is calculated using the Schröder Calculation of Flammability Limits.

At step/operation 955, a processor (such as, but not limited to, the processing circuitry 305 of the monitoring device 130 described above in connection with FIG. 3) compares the calculated LEL % for the combination of gases identified at step/operation 940 to a predetermined threshold. If it is determined at step/operation 955 that the calculated LEL % for the identified combination of gases exceeds the predetermined threshold, at step/operation 960 a processor (such as, but not limited to, the processing circuitry 305 of the monitoring device 130 described above in connection with FIG. 3) triggers an LEL alarm. In some embodiments, there are more than one threshold, such as a low threshold and a high threshold which each trigger different alarms/actions. In some embodiments, the triggering of an LEL alarm is transmitted to one or more user devices 160 (e.g., mobile phone or the like) to be displayed for a user to view.

In some embodiments, regardless of whether it is determined at step/operation 955 that the calculated LEL % for the identified combination of gases exceeds the predetermined threshold, the process 900 returns to step/operation 910 to be repeated at predetermined intervals, such as every five minutes.

The example user interface of FIG. 12 is a graphical representation of an example identification of gas(es) and concentration(s) displayed on a user device 160. FIG. 12 illustrates a user interface 1200 showing the detection results 1210 (specifically the identity ("GAS 1," "GAS 2," etc.) and concentration percentage) for five selected gases. In the example embodiment illustrated, a dropdown menu 1205 enables a user to select a location/facility/sensor for which to display its detected gases. The example user interface of FIG. 12 further shows the determined LEL % 1215 of the detected combination of gases, as well as displaying an LEL alarm 1220 if so triggered.

Having described example systems, apparatuses, computing environments, and user interfaces associated with embodiments of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. In regard to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
separately scanning each of a predetermined plurality of different training gases with infrared light at each of a first predetermined plurality of different wavelengths;
for each of the predetermined plurality of different training gases, detecting and recording the absorption of the infrared light at each of the first predetermined plurality of different wavelengths;
creating a plurality of training absorption waveforms, one training absorption waveform for each possible different combination of each of the predetermined plurality of different training gases at each of a predetermined plurality of different concentrations and at each of a predetermined plurality of different temperatures;
determining a plurality of training waveform features of each training absorption waveform;
inputting the plurality of training waveform features for each training absorption waveform into a data model to train the data model;
scanning an unknown gas or an unknown combination of gases with infrared light at each of a second predetermined plurality of different infrared wavelengths;
detecting and recording the absorption of the infrared light at each of the second predetermined plurality of different wavelengths;
creating a detection absorption waveform for the scanned unknown gas or unknown combination of gases;
determining a plurality of detection waveform features of the detection absorption waveform;
inputting the plurality of detection waveform features of the detection absorption waveform into the data model;
generating from the data model an identity and concentration of the unknown gas or of each gas of the unknown combination of gases; and
displaying the identity and concentration of the unknown gas or of each gas of the unknown combination of gases on at least one display;
wherein the unknown gas or unknown combination of gases comprises one or more of the predetermined plurality of different training gases.

2. The method of claim 1, wherein the second predetermined plurality of different wavelengths equals the first predetermined plurality of different wavelengths or the second predetermined plurality of different wavelengths is a subset of the first predetermined plurality of different wavelengths.

3. The method of claim 2, wherein the first and second predetermined plurality of different wavelengths are evenly spaced over a predetermined wavelength range.

4. The method of claim 1, wherein separately scanning each of the predetermined plurality of different training gases comprises separately scanning each of the predetermined plurality of different training gases at each of the predetermined plurality of different concentrations.

5. The method of claim 1, wherein separately scanning each of the predetermined plurality of different training gases comprises separately scanning each of the predetermined plurality of different training gases at each of the predetermined plurality of different temperatures.

6. The method of claim 1, further comprising:
determining a temperature of the scanned unknown gas or unknown combination of gases; and
inputting the determined temperature of the scanned unknown gas or unknown combination of gases into the data model.

7. The method of claim 1, further comprising determining a lower explosion limit percentage of the scanned unknown gas or unknown combination of gases.

8. An apparatus comprising at least one processor and at least one non-transitory memory comprising program code, wherein the at least one non-transitory memory and the program code are configured to, with the at least one processor, cause the apparatus to at least:
separately scan each of a predetermined plurality of different training gases with infrared light at each of a first predetermined plurality of different wavelengths;
for each of the predetermined plurality of different training gases, detect and record the absorption of the infrared light at each of the first predetermined plurality of different wavelengths;
create a plurality of training absorption waveforms, one training absorption waveform for each possible different combination of each of the predetermined plurality of different training gases at each of a predetermined plurality of different concentrations and at each of a predetermined plurality of different temperatures;
determine a plurality of training waveform features of each training absorption waveform;
input the plurality of training waveform features for each training absorption waveform into a data model to train the data model;
scan an unknown gas or an unknown combination of gases with infrared light at each of a second predetermined plurality of different infrared wavelengths;
detect and record the absorption of the infrared light at each of the second predetermined plurality of different wavelengths;
create a detection absorption waveform for the scanned unknown gas or unknown combination of gases;
determine a plurality of detection waveform features of the detection absorption waveform;
input the plurality of detection waveform features of the detection absorption waveform into the data model;
generate from the data model an identity and concentration of the unknown gas or of each gas of the unknown combination of gases; and display the identity and concentration of the unknown gas or of each gas of the unknown combination of gases on at least one display;

wherein the unknown gas or unknown combination of gases comprises one or more of the predetermined plurality of different training gases.

9. The apparatus of claim 8, wherein the second predetermined plurality of different wavelengths equals the first predetermined plurality of different wavelengths or the second predetermined plurality of different wavelengths is a subset of the first predetermined plurality of different wavelengths.

10. The apparatus of claim 9, wherein the first and second predetermined plurality of different wavelengths are evenly spaced over a predetermined wavelength range.

11. The apparatus of claim 8, wherein separately scanning each of the predetermined plurality of different training gases comprises separately scanning each of the predetermined plurality of different training gases at each of the predetermined plurality of different concentrations.

12. The apparatus of claim 8, wherein separately scanning each of the predetermined plurality of different training gases comprises separately scanning each of the predetermined plurality of different training gases at each of the predetermined plurality of different temperatures.

13. The apparatus of claim 8, wherein the at least one non-transitory memory and the program code are further configured to, with the at least one processor, cause the apparatus to at least:

determine a temperature of the scanned unknown gas or unknown combination of gases; and input the determined temperature of the scanned unknown gas or unknown combination of gases into the data model.

14. The apparatus of claim 8, wherein the at least one non-transitory memory and the program code are further configured to, with the at least one processor, cause the apparatus to at least determine a lower explosion limit percentage of the scanned unknown gas or unknown combination of gases.

15. A computer program product comprising at least one non-transitory computer-readable storage medium having computer-readable program code portions stored therein, the computer-readable program code portions comprising an executable portion configured to:

separately scan each of a predetermined plurality of different training gases with infrared light at each of a first predetermined plurality of different wavelengths;

for each of the predetermined plurality of different training gases, detect and record the absorption of the infrared light at each of the first predetermined plurality of different wavelengths;

create a plurality of training absorption waveforms, one training absorption waveform for each possible different combination of each of the predetermined plurality of different training gases at each of a predetermined plurality of different concentrations and at each of a predetermined plurality of different temperatures;

determine a plurality of training waveform features of each training absorption waveform;

input the plurality of training waveform features for each training absorption waveform into a data model to train the data model;

scan an unknown gas or an unknown combination of gases with infrared light at each of a second predetermined plurality of different infrared wavelengths;

detect and record the absorption of the infrared light at each of the second predetermined plurality of different wavelengths;

create a detection absorption waveform for the scanned unknown gas or unknown combination of gases;

determine a plurality of detection waveform features of the detection absorption waveform;

input the plurality of detection waveform features of the detection absorption waveform into the data model;

generate from the data model an identity and concentration of the unknown gas or of each gas of the unknown combination of gases; and display the identity and concentration of the unknown gas or of each gas of the unknown combination of gases on at least one display;

wherein the unknown gas or unknown combination of gases comprises one or more of the predetermined plurality of different training gases.

16. The computer program product of claim 15, wherein the second predetermined plurality of different wavelengths equals the first predetermined plurality of different wavelengths or the second predetermined plurality of different wavelengths is a subset of the first predetermined plurality of different wavelengths.

17. The computer program product of claim 16, wherein the first and second predetermined plurality of different wavelengths are evenly spaced over a predetermined wavelength range.

18. The computer program product of claim 15, wherein separately scanning each of the predetermined plurality of different training gases comprises separately scanning each of the predetermined plurality of different training gases at each of the predetermined plurality of different concentrations.

19. The computer program product of claim 15, wherein separately scanning each of the predetermined plurality of different training gases comprises separately scanning each of the predetermined plurality of different training gases at each of the predetermined plurality of different temperatures.

20. The computer program product of claim 15, wherein the computer-readable program code portions further comprise an executable portion configured to:

determine a temperature of the scanned unknown gas or unknown combination of gases; and input the determined temperature of the scanned unknown gas or unknown combination of gases into the data model.

* * * * *